United States Patent
Harker

(10) Patent No.: US 12,359,698 B2
(45) Date of Patent: Jul. 15, 2025

(54) ROLLER CLUTCH

(71) Applicant: Brian Harker, Granger, IN (US)

(72) Inventor: Brian Harker, Granger, IN (US)

(*) Notice: Subject to any disclaimer, the term of this patent is extended or adjusted under 35 U.S.C. 154(b) by 0 days.

(21) Appl. No.: 18/659,753

(22) Filed: May 9, 2024

(65) Prior Publication Data

US 2024/0286251 A1    Aug. 29, 2024

Related U.S. Application Data

(63) Continuation-in-part of application No. 17/938,197, filed on Oct. 5, 2022, now Pat. No. 12,006,987.

(60) Provisional application No. 63/252,680, filed on Oct. 6, 2021.

(51) Int. Cl.
*F16D 41/067*    (2006.01)
*B25B 13/46*    (2006.01)

(52) U.S. Cl.
CPC .......... *F16D 41/067* (2013.01); *B25B 13/466* (2013.01)

(58) Field of Classification Search
CPC ........... F16D 41/067; F16D 2041/0605; F16D 2041/0665; B25B 13/462; B25B 13/04; B25B 13/466
See application file for complete search history.

(56) References Cited

U.S. PATENT DOCUMENTS

| | | | | |
|---|---|---|---|---|
| 3,187,869 | A * | 6/1965 | Spencer | F16D 41/067 192/45.01 |
| 5,937,981 | A * | 8/1999 | Adams | F16D 41/086 81/63.1 |
| 2010/0178003 | A1* | 7/2010 | Rusteberg | F16C 25/083 384/563 |
| 2011/0155531 | A1* | 6/2011 | Nease, III | F16D 41/088 192/71 |
| 2016/0271771 | A1* | 9/2016 | Harker | B25B 13/04 |

* cited by examiner

*Primary Examiner* — Lori Wu
(74) *Attorney, Agent, or Firm* — BOTKIN & HALL, LLP; Michael D. Marston

(57) ABSTRACT

A locking clutch having an inner race that is rotatable with respect to an outer race. One of the races is cylindrically shaped and rotates adjacent to a race having facets. Rollers are located adjacent to the facets. A cage having fingers may be restrained with respect to the facets to set the starting position of the rollers. The cage may be selectively restrained to determine the direction in which the rollers are wedged to determine a direction that drives the rollers into contact with both races to lock the races with respect to each other. Rotation of the inner race with respect to the outer race in a direction opposite direction is a free rotating direction. The locking clutch is designed to simultaneously engage all of its rollers to evenly distribute the forces amongst them.

17 Claims, 32 Drawing Sheets

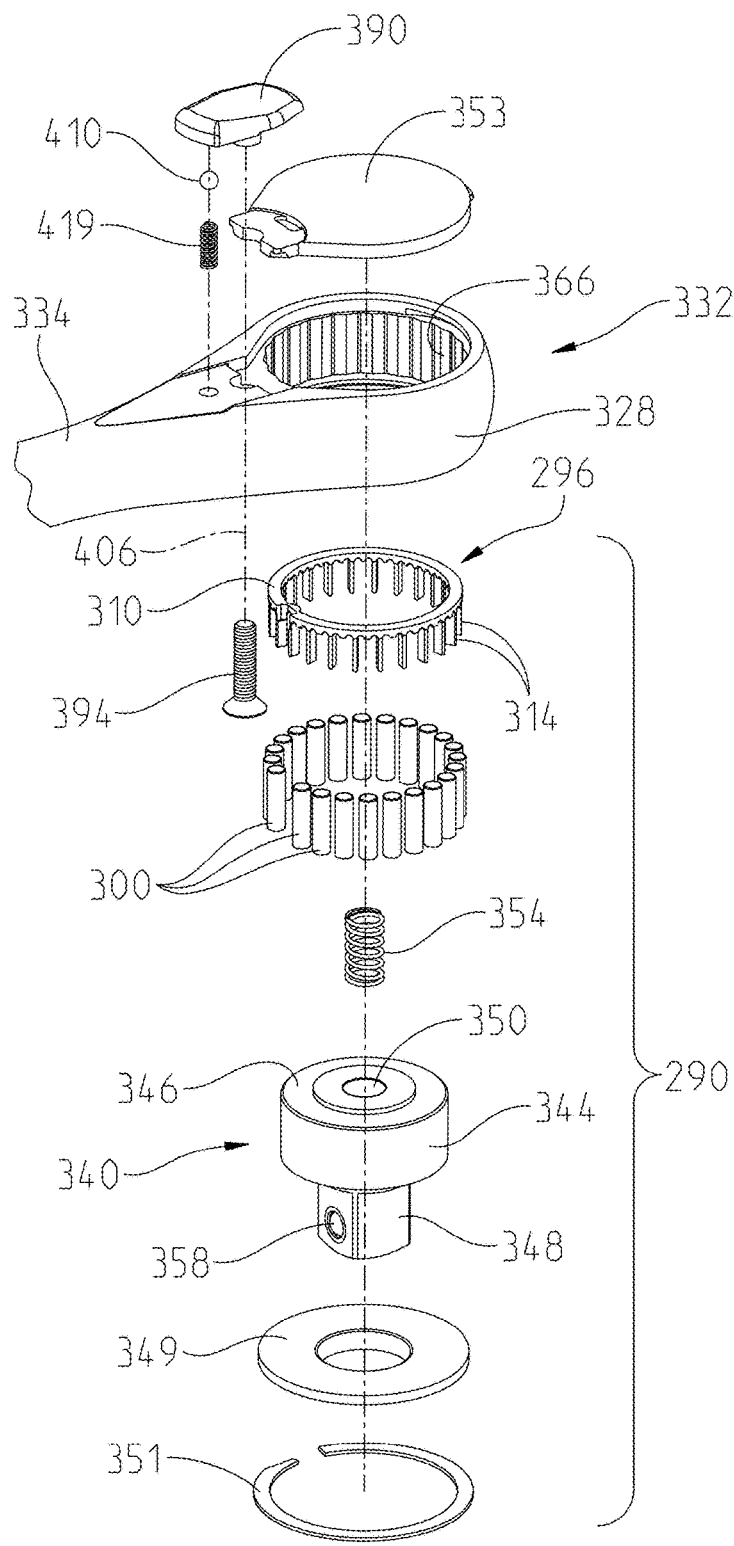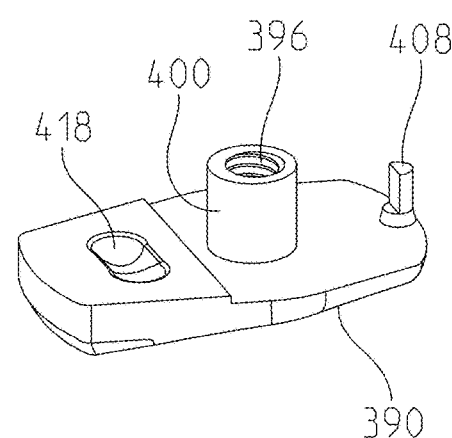
Fig. 18
Fig. 19

ROLLER CLUTCH

CROSS-REFERENCE TO RELATED APPLICATIONS

This application is a Continuation-in-Part and claims the benefit of U.S. Utility application Ser. No. 17/938,197, filed Oct. 5, 2022, which claims the benefit of Provisional Application No. 63/252,680, filed Oct. 6, 2021. The disclosures of which are hereby incorporated by reference.

BACKGROUND OF THE INVENTION

Roller clutches are devices that transfer a torque in one direction and move freely in the opposite direction. Roller clutches work by wedging one or more rollers between two surfaces to prevent relative motion between the two surfaces in one direction (a locking direction), thereby providing for the application of torque in the locking direction.

Examples of roller clutches used in connection with hand tools are shown in U.S. Pat. Nos. 9,902,049; 9,958,019; and 11,110,570. Each of these patents discloses a roller clutch for use in connection with a ratcheting wrench or tool. The roller clutches disclosed in these patents permit the user to selectively determine and change the locking direction to apply force to a bolt, nut, or other object, while permitting the wrench to rotate in the opposite direction without applying force to the bolt, nut or other object.

For a roller clutch to be useful in a hand tool it is necessary for the roller clutch to be able to apply a significant amount of torque in the locking direction without slipping. A roller clutch may use spherical rollers such as ball bearings, but using cylindrical rollers is preferred because loads imparted thereon can be distributed along the length of rollers as the cylindrical rollers are wedged between the two surfaces. A significant challenge for maximizing the torque that a roller clutch may transmit in the locking direction is achieving simultaneous engagement of all of the rollers when they are wedged. Past efforts at achieving simultaneous engagement have involved having very tight tolerances on the surfaces as well as tight tolerances on the rollers themselves. Simultaneous engagement of the rollers has required that all of the rollers be nearly identical and those rollers also must be coupled to nearly perfect surfaces. In practice, this has been nearly impossible to achieve, and even if nearly perfect tolerances are achieved, that is only done at an unreasonable expense. Slight variations away from perfectly sized rollers and perfect mating surfaces meant that only a portion of the rollers engage, or that they engage unevenly. As such, having only partial engagement or uneven engagement of the available rollers limits the amount of torque that can be transmitted in the locking direction. There remains an unmet need to have a roller clutch that has simultaneous engagement of its rollers that can be made at a reasonable cost to manufacture.

SUMMARY OF THE INVENTION

The present invention is a locking clutch having an inner race that is rotatable with respect to an outer race. One of the races has a cylindrically shaped surface that is adjacent to the other race. The other race has a plurality of valleys that are located relatively far from the cylindrical race. Each valley is connected to a corresponding inclined surface that is adjacent to each valley. A plurality of rollers are located between the races and adjacent to the valleys. A cage having fingers is restrained with respect to the valleys so that the fingers hold the rollers in a first position with respect to the valleys. Rotation of the inner race with respect to the outer race in one direction induces the rollers to roll away from the corresponding valleys along the inclined surface. This movement of the rollers away from the valleys drives the rollers into contact with both races and locates the rollers in a second position that is a wedging position. This direction of rotation is a wedging direction that causes locking of the races with respect to each other. Rotation of the inner race with respect to the outer race in a direction opposite to the wedging direction tends to urge the rollers toward their first position and this direction of rotation is a free rotating direction.

In another aspect of the invention, the cage may be shiftable so that the first position of the rollers may be on inclined surfaces that straddle the valleys. The side of the valley on which the roller starts due to its positioning via the fingers of the cage determines the wedging direction.

In another aspect of the invention, springs that bias the springs may have a preinstalled position and are subsequently bent in plastic and elastic deformation to more uniformly bias the rollers into a wedging position with respect to the races.

BRIEF DESCRIPTION OF THE DRAWINGS

FIG. 18 is an exploded perspective view of components of the wrench shown in FIG. 16, including the roller clutch of the wrench shown in FIG. 16.

FIG. 19 is a perspective view of a switch that is a component of the wrench shown in FIG. 16.

DESCRIPTION OF THE PREFERRED EMBODIMENT

Figure 1:
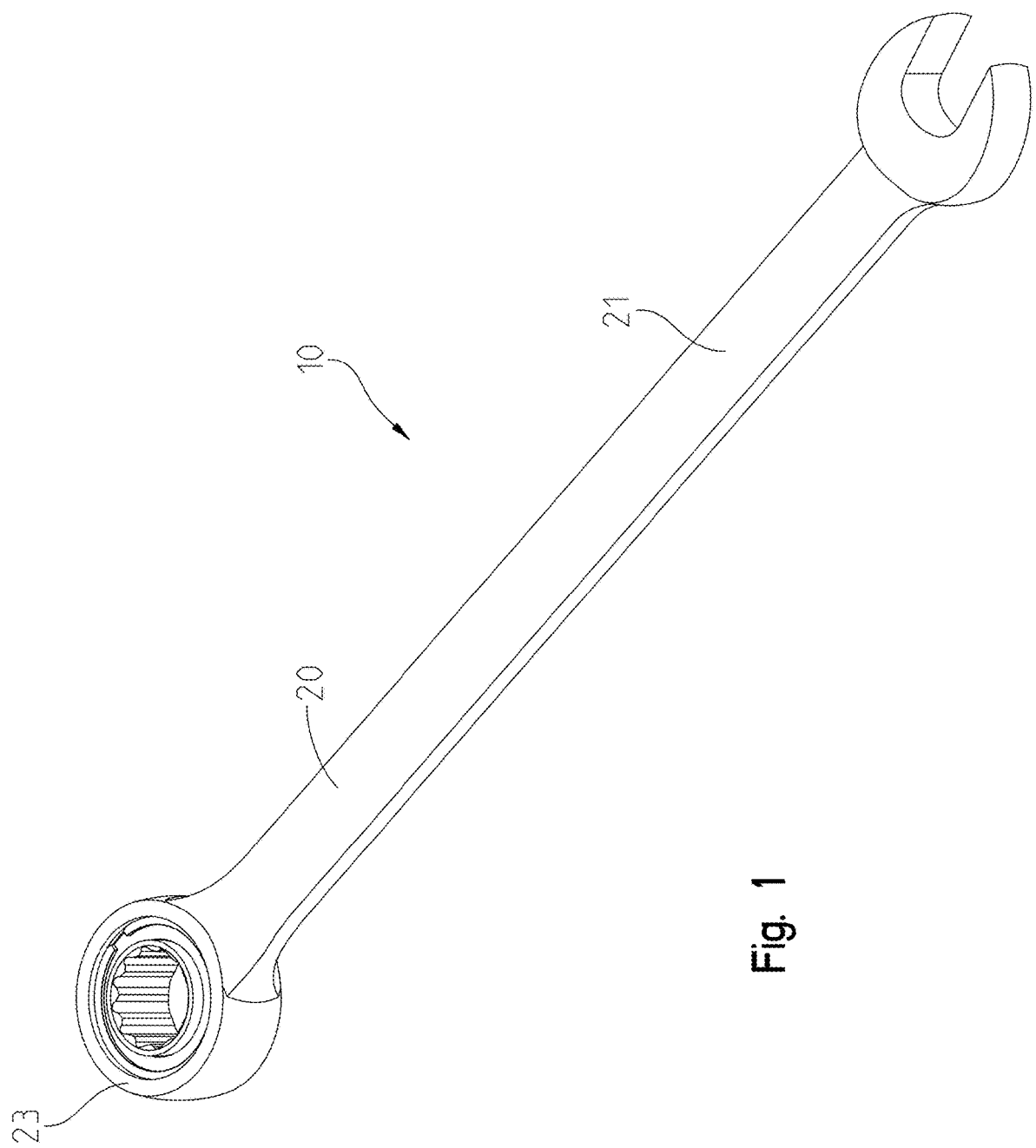
FIG. 1 is a perspective view of a wrench including a roller clutch according to one embodiment of the present invention.
Figure 2:
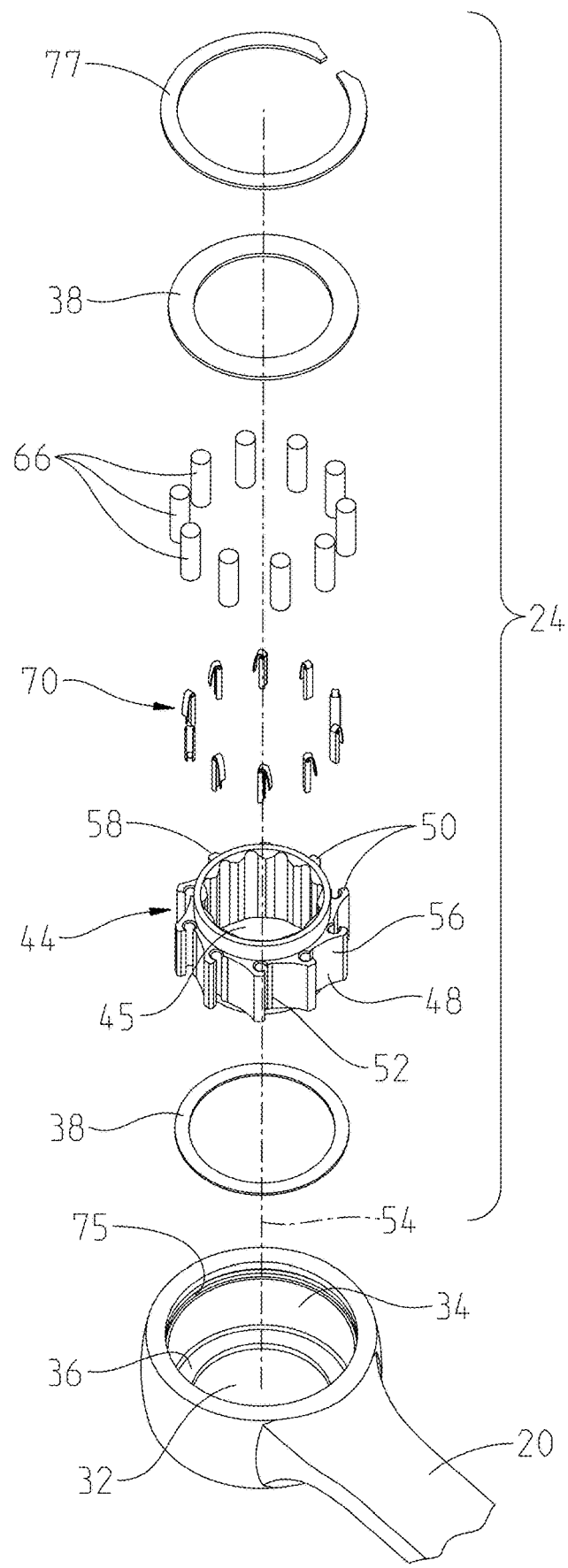
FIG. 2 is an exploded perspective view of the wrench shown in FIG. 1.
Figure 3:
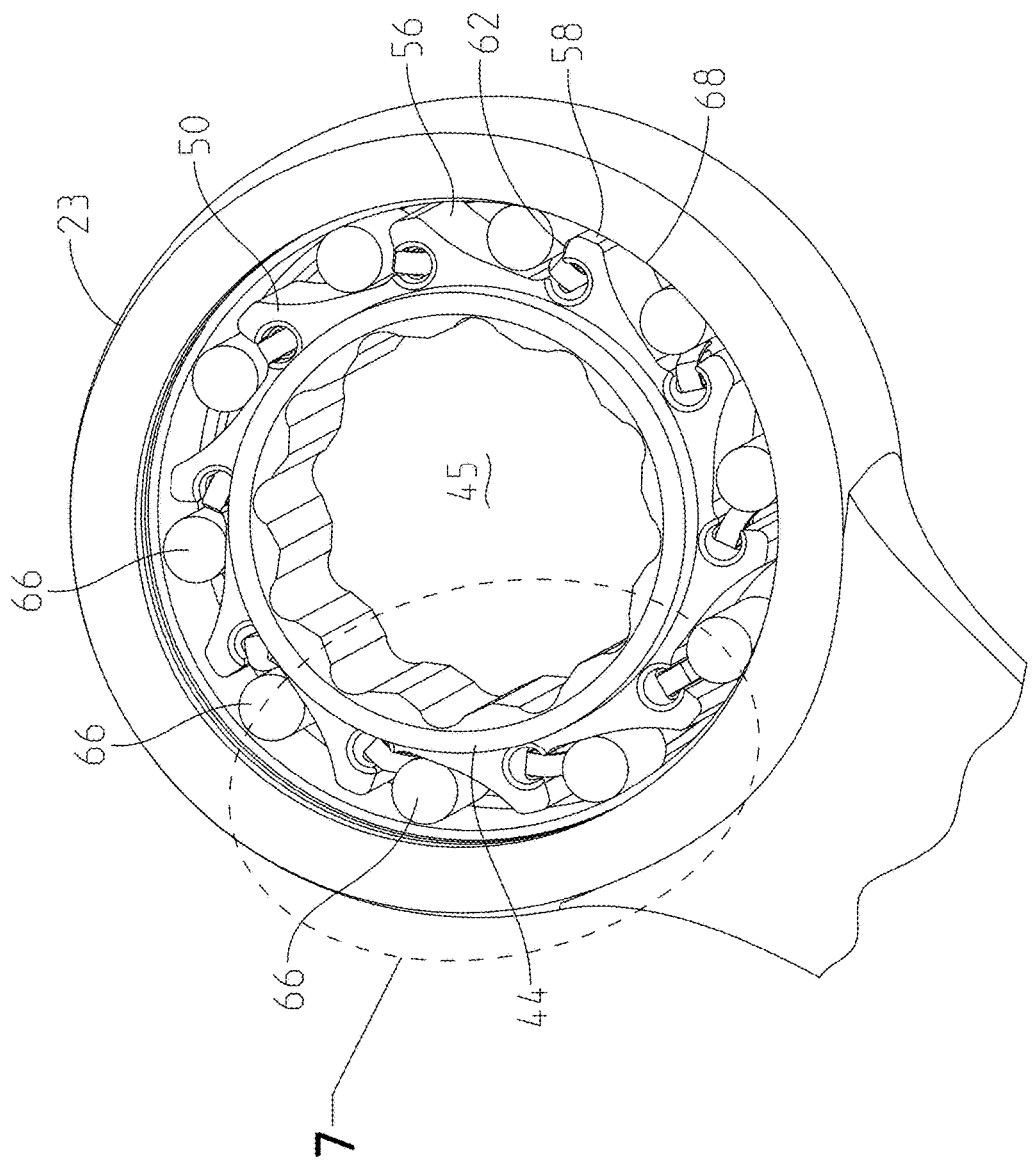
FIG. 3 is a perspective view of one end of the wrench shown in FIG. 1 with certain components removed to illustrate the relationship between other components of the wrench.
Figure 4:
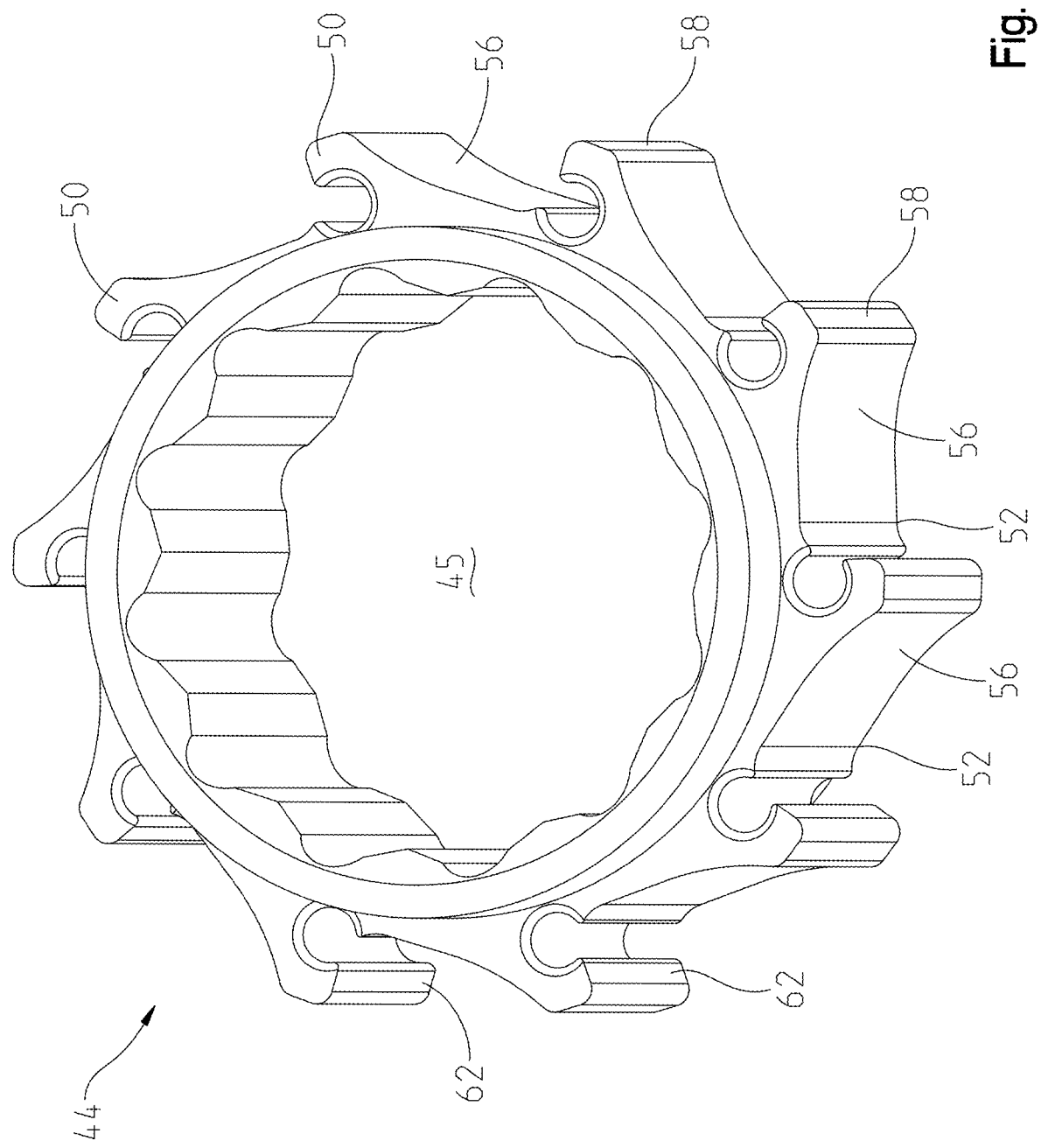
FIG. 4 is a perspective view of a spindle that is a component of the roller clutch of the wrench shown in FIG. 1.
Figure 5:
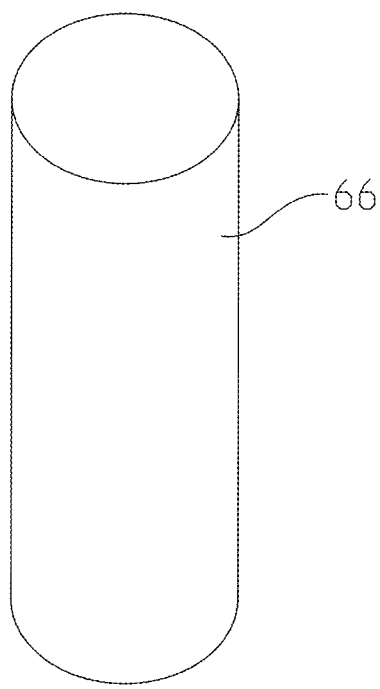
FIG. 5 is a perspective view of a roller that is a component of the roller clutch of the wrench shown in FIG. 1.
Figure 6:
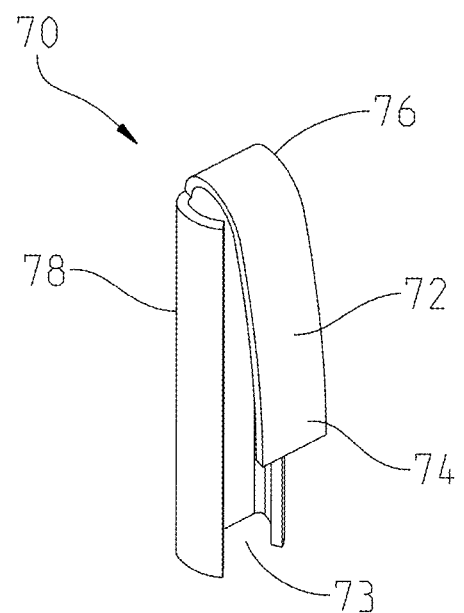
FIG. 6 is a perspective view of a biasing member that is a component of the roller clutch of the wrench shown in FIG. 1.
Figure 7:
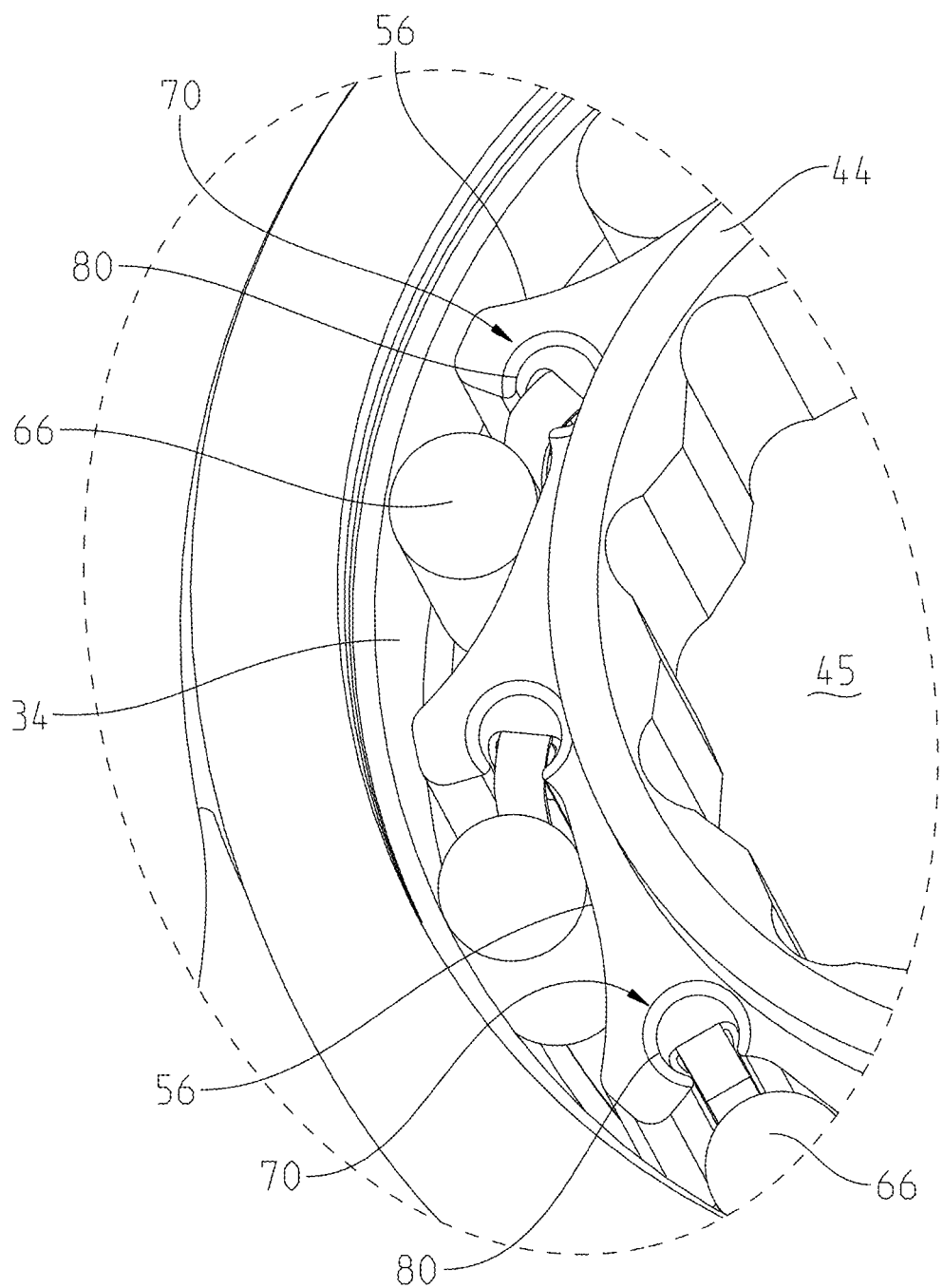
FIG. 7 is a detail view of the area labeled FIG. 7 in FIG. 3.
Figure 8:
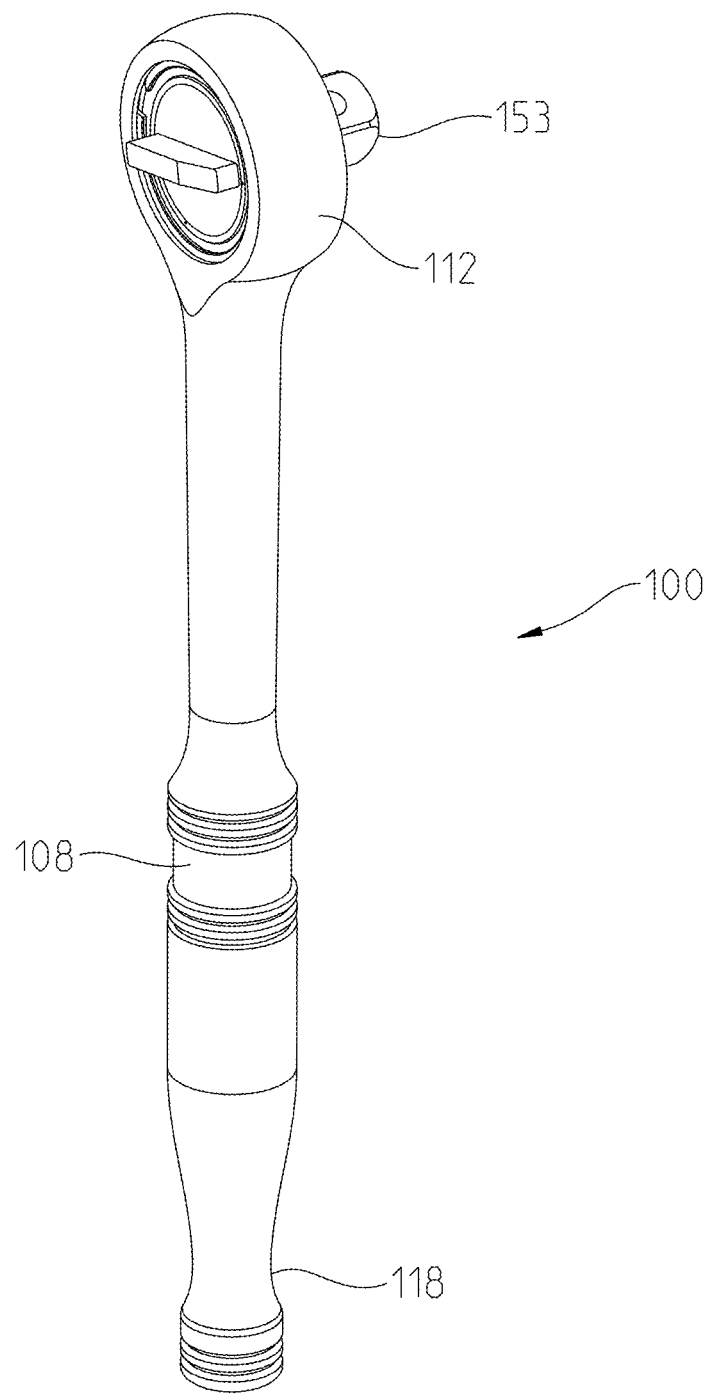
FIG. 8 is a perspective view of a wrench including a roller clutch according to another embodiment of the present invention.
Figure 9:
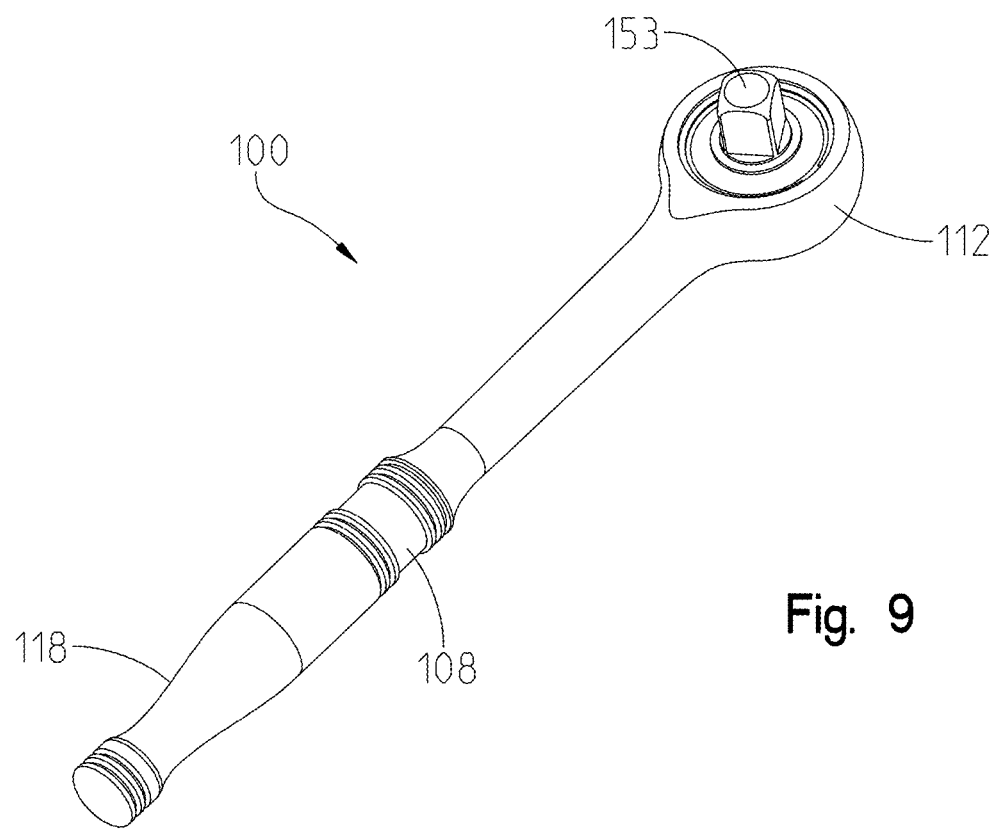
FIG. 9 is a front perspective view of the wrench shown in FIG. 8.
Figure 10:
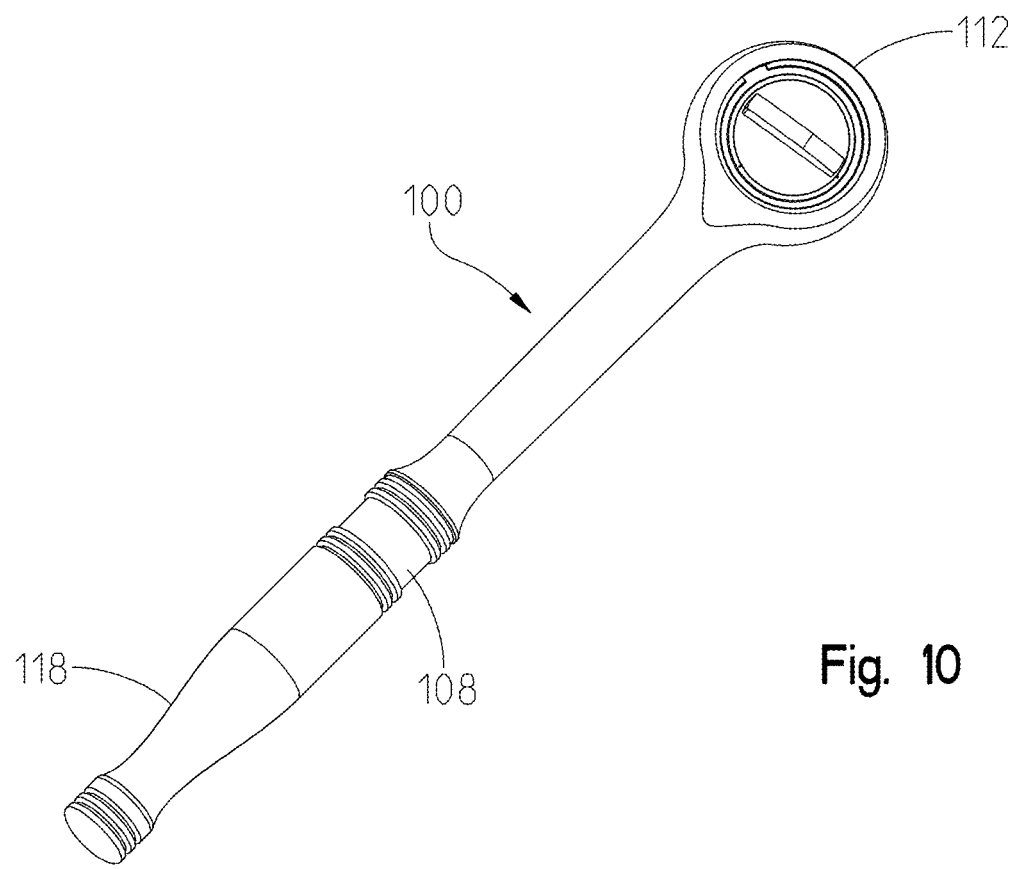
FIG. 10 is a rear perspective view of the wrench shown in FIG. 8.

FIG. 1 shows a roller clutch of the present invention in the application of a ratcheting wrench 10. The wrench has a handle 20 with a distal end 21 that is connected to a head 23. The head 23 contains a roller clutch 24. The components of the roller clutch 24 and how it is assembled into the head 23 of the wrench 10 is shown in FIG. 2 which is an exploded view.

The head 23 has a chamber 32 having a cylindrical race 34 that defines the outer boundary of the chamber 32 within the head 23. The cylindrical race 34 is terminated on one side by a base ledge 36 that serves as a retention feature for parts installed within the chamber 32 of the head 23. A washer 38 is placed on the base ledge 36 to facilitate the rotation of parts installed above the washer 38. The washer 38 may be a high-density low friction plastic or metal part. A spindle 44 is rotatably installed above the washer 38 within the chamber 32. The spindle 44 has a center opening 45 that as shown in FIGS. 1-7, is designed as a twelve-point wrench for engaging fasteners. However, it is contemplated that the center opening 45 of the spindle 44 may be other shapes designed to engage other fasteners. The spindle 44 has a second race 48 that has a series of lobes 50 protruding radially outward. The second race 48 a series of valleys 52 that are radially nearest a central axis 54 about which the spindle 44 rotates within the cylindrical race 34. The valleys 52 on the second race 48 are adjacent to inclined surfaces 56 that extend continuously from the valleys 52 on the second race 48 and end at an outer diameter surface 58 that is the radially outermost portion of each lobe 50. The inclined surfaces 56 are concave as they face the cylindrical race 34. The valleys 52 form a continuous surface with the inclined surfaces 56. Each lobe 50 has a back surface 62 that faces an adjacent valley 52. When the spindle 44 is assembled within the head 23 the second race 48 is located adjacent to and within the cylindrical race 34. In the assembled condition, shown in FIG. 3, the valleys 52 are the relatively farthest portion of the second race 48 from the cylindrical race 34. The inclined surfaces 56 that are adjacent to the valleys 52 gradually slope in a direction nearer to the cylindrical race 34.

Each lobe 50 of the spindle 44 is designed to have a roller 66 held adjacent thereto. Although the rollers 66 are shown as cylindrical elements, the rollers 66 can have other shapes such ovals as their cross section. Each roller 66 is adjacent to a corresponding valley 52. The rollers 66 are held captive between the cylindrical race 34, a corresponding inclined surface 56, a valley 52, and a corresponding back surface 62. These adjacently located surfaces form a cavity 68 that captures each roller 66 between the races 34, 48. The rollers are movable from a first position locating said rollers 66 relatively near their corresponding valleys 52 to a second position where each roller is located farther from its corresponding valley than in the first position. This movement occurs in a smooth controlled way. Movement from the first position to the second position may be imperceptibly small. In other words, movement from the first position to the second position correlates to movement of each roller 66 along its adjacent inclined surface 56 away from its corresponding adjacent valley. The second position is limited by the roller 66 impinging on both the inclined surface 56 and the cylindrical race 34.

Springs 70 bias each roller toward the second position and along the inclined surfaces 56. Each spring 70 has a cantilevered biasing member 72 with a distal end 74 that is opposite a proximal end 76. The proximal end 76 is attached to a mounting portion 78 that is a tubular section having a slit 73. The mounting portion 78 is compressible so that the sides of the slit 73 may be compressed toward each other. The mounting portions 78 of the springs 70 are pressed into notches 80 on the back surfaces 62 of the lobes 50. Because the mounting portions 78 are resilient they press outwardly on the notch 80 in which they are inserted and thereby retain the position of each spring 70 into its corresponding notch 80. Once the springs 70 are pressed into their corresponding notches 80, the distal end 74 of the cantilevered biasing member 72 extends away from the back surface 62 at a preinstalled distance corresponding to when the spindle 44 is not contained by the cylindrical race 34 in the head 23. The spindle 44 is put into the cylindrical race 34 and the rollers 66 are placed adjacent to the cantilevered biasing members 72. The spindle 44 and rollers 66 are held within the cylindrical race 34 by another washer 38 and snap ring 77 installed in groove 75. The insertion of the rollers 66 into their corresponding cavities 68 next to corresponding springs 70 plasticly deform each cantilevered biasing member 72 to an installed position that locates the distal end 74 of each cantilevered biasing member 72 nearer the second race 48 on the spindle. More specifically, the cantilevered biasing members 72 are closer to the back surface 62, which is a portion of the second race 48. It should be noted that the distal end 74 is where the biasing member 72 contacts its corresponding roller 66 and depending on the shape of the biasing members 72 there may be some portion of the biasing member 72 that extends beyond the distal end 74. An example of this would be if the terminal end of the biasing member 72 were bent away from the roller 66 slightly to avoid having a sharp edge contacting the roller 66. Plastic deformation during movement between the preinstalled position of the cantilevered biasing member 72 to its installed position also occurs along with some elastic deformation. The amount of plastic deformation of each spring 70 to its installed position corresponds to the conditions within each corresponding cavity 68 where each spring 70 is located provides a nearly uniform preload for each spring 70 to bias its corresponding roller 66 into the races 34, 48. Once the plastic deformation necessary to move the cantilevered biasing member 72 of each spring 70 from its preinstalled position to its installed position has occurred, the force exerted by each spring 70 to bias each corresponding roller 66 will depend on the Young's modulus of the material of which the springs 70 are made. Once the plastic deformation has occurred, the stress strain curve for the springs 70 will have been shifted so that the start position of further bending of the cantilevered biasing member 72 from its installed position toward the back surface 62 of the second race 48 will be in an elastic range. That start point of bending will be exactly where the distal end 74 contacts its corresponding roller 66. In this manner, the start point of elastic bending within each spring 70 will be customized to the specific conditions in each cavity 68 defined by the diameter of each particular roller 66, the corresponding inclined surface 56, the location of the spring 70 on the corresponding back surface 62, and the cylindrical race 34. Thus, any deviation in tolerances of these aforementioned parameters will be compensated for by the plastic deformation of the springs 70 from the preinstalled position to the installed position. This will enable nearly uniform pressure on each roller 66 and facilitate near simultaneous engagement of all of the rollers 66 when move toward their second position.

Movement of the rollers 66 into the second position is facilitated by rotation of the spindle 44 with respect to the cylindrical race 34 in the head 23. Ultimately, this movement drives the rollers 66 into their second position. This will cause the rollers 66 to wedge against their corresponding adjacent inclined surfaces 56 and the cylindrical race 34 when the spindle 44 is rotated in a particular direction with respect to the cylindrical race 34. This wedging contact will effectively lock the spindle 44 with respect to the head 23 and allow torque to be applied through the center opening 45 of the spindle 44. The inclined surfaces 56 are concave and this maximizes the contact area the rollers 66 have with the second race 48 as they are wedged between the inclined surfaces 56 of the second race 48 and the cylindrical race 34. As an example of the wedging action, rotation of the spindle 44 in a clockwise direction as viewed in FIG. 3 with respect to the cylindrical race 34 and head 23 will wedge the rollers 66 between the inclined surfaces 56 and cylindrical race 34. This relative movement causing wedging of the rollers 66 is also achieved by rotating the handle 20 and head 23 counterclockwise with respect to the spindle 44. The relative movement of the spindle 44 with respect to the head 23 as described to cause wedging of the rollers 66 is a wedging direction of rotation. Rotating the handle 20 of the wrench 10 in the wedging direction makes the present invention particularly useful. The utility of the configuration described in FIGS. 1-7 is derived by nearly instantaneous locking of the spindle 44 with respect to the head 23. In a typical ratcheting wrench or standard ratchet, there is a lag from when a user rotates the handle 20 of such a device and when the spindle 44 locks in a particular direction so torque may be applied to a fastener. This means the handle 20 may move a significant distance in an arc around the spindle 44 before actually imparting torque on a fastener. This movement before torque is applied to the fastener may be considered dead travel because it is wasted motion that does nothing to accomplish the task of applying torque. The near instantaneous locking of the spindle 44 in the wedging direction is achieved in part because each roller 66 is biased toward its second position by the springs 70 so that each roller 66 is in simultaneous contact with its corresponding inclined surface 56 and the cylindrical race 34. Rotating the handle 20 in the wedging direction imparts movement of each roller 66 along its inclined surface 56 away from their valleys 52 because the cylindrical race 34 drags the rollers 66, that are already contacting the cylindrical race 34 via spring 70 bias, further into the cylindrical race 34. As mentioned above, the springs 70 provide an even bias on the rollers 66 independent of variations in tolerances. Therefore, the rollers 66 simultaneously engage to lock the spindle 44 with respect to the head 23 in the wedging direction. This provides for immediate application of torque through the spindle 44 when the handle 20 is rotated in the wedging direction. The even bias of the springs 70, as described above, evenly distributes the wedging force amongst the plurality of rollers 66. Even distribution of wedging forces prevents disproportionate forces on any one roller 66 that may engage ahead of the other rollers 66 because of slight variations in tolerance. Such premature engagement of any one roller 66 could cause brinelling of the surfaces in contact due to plastic deformation and could cause the roller 66 to permanently lock. Due to the nearly simultaneous engagement of all of the rollers 66, a significant amount of torque can be applied to the handle 20 before any of the rollers 66 would be plastically deformed or cause brinelling into the races 34, 48. The simultaneous engagement of the rollers 66 in the present invention also minimizes dead travel that could result from deformation of rollers 66 or surfaces they contact because the even load spreading across the rollers 66 minimizes any deformation of mating surfaces under torque. Rotating the handle 20 and head 23 in the opposite direction to the wedging direction corresponds to a free rotating direction. The free rotating direction corresponds to the head 23 and cylindrical race 34 rotating clockwise with respect to the spindle 44 as viewed in FIG. 3. The motion of the free rotating direction tends to drag the rollers 66 toward their first position moving the rollers 66 relatively nearer their corresponding valleys 52. Although this movement toward the first position may be very small, the rollers will tend to very slightly drag on the cylindrical race 34 which urges the rollers 66 nearer the valleys to facilitate free rotation opposite the wedging direction of rotation. Because the rollers 66 have force distributed evenly amongst them, no brinelling will occur between the rollers 66 or races 34, 48. When the cylindrical race 34 rotates in the free rotating direction, the rollers 66 release immediately because no brinelling has occurred. If a user of the wrench 10 shown in FIGS. 1-7 wishes to reverse the direction in which torque may be applied to a fastener, the wrench 10 may be flipped over to achieve that reversal of the wedging direction that locks the spindle 44.

It should also be noted that the aforementioned assembly of the wrench 10 above could have inclined surfaces 56 located within the head 23 and the cylindrical race 34 could be on the spindle 44. Such a configuration would be the exact opposite of that shown in FIGS. 1-7, but would produce the same wedging action through relative movement of the spindle 44 with respect to the head 23.

Although the wrench 10 described above does not have a mechanism that allows purposeful changing of the wedging direction and the free rotating direction it is possible to do so. FIGS. 8-15 illustrate such a roller clutch 130 that allows the wedging direction to be changed. The ratcheting wrench 100 has a handle 108 that is attached to a head 112. The handle 108 has a distal end 118 that is opposite of the end of the handle 108 that is attached to a head 112.

Figure 11:
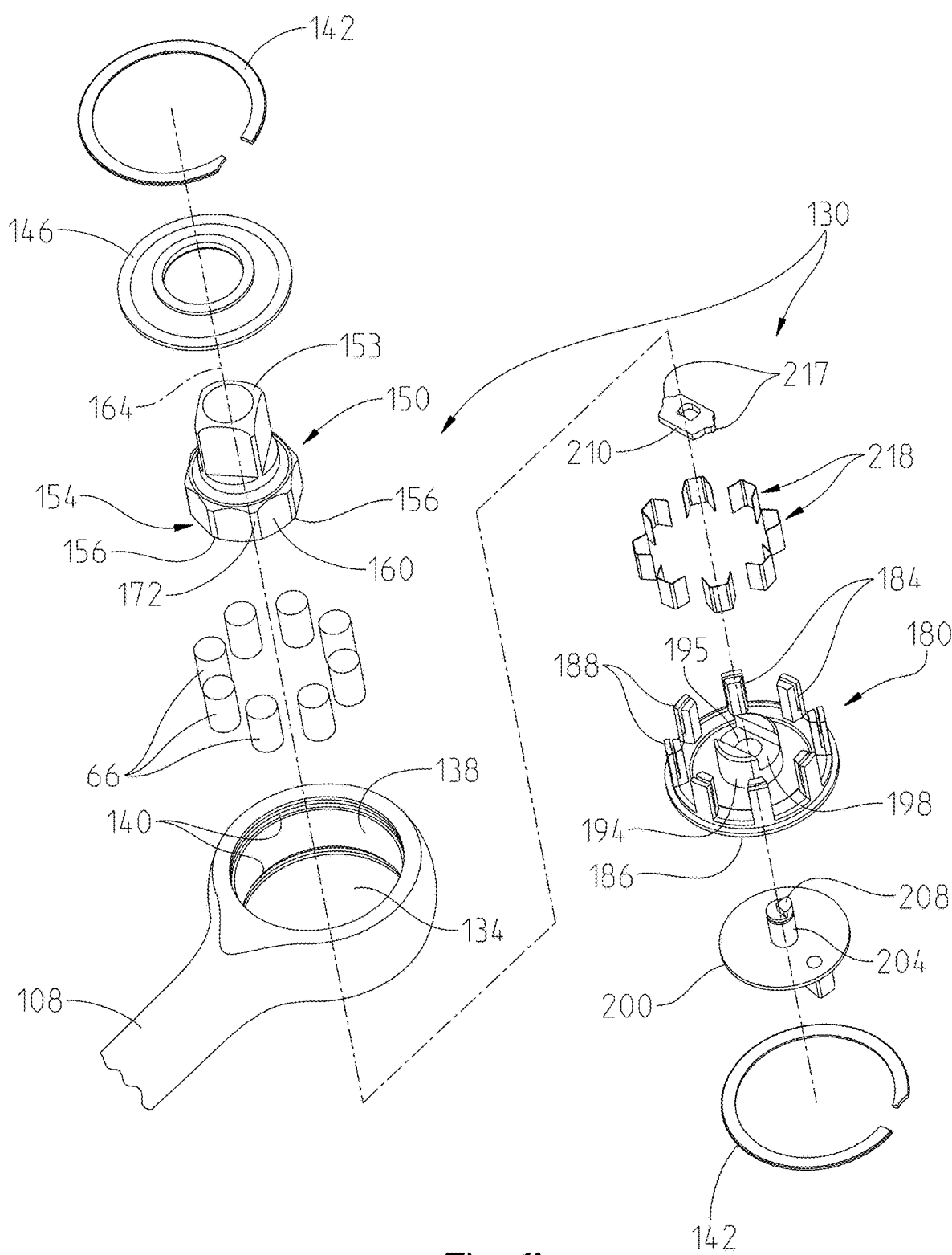
FIG. 11 is an exploded perspective view of components of the wrench shown in FIG. 8, including the roller clutch of the wrench shown in FIG. 8.
Figure 12:
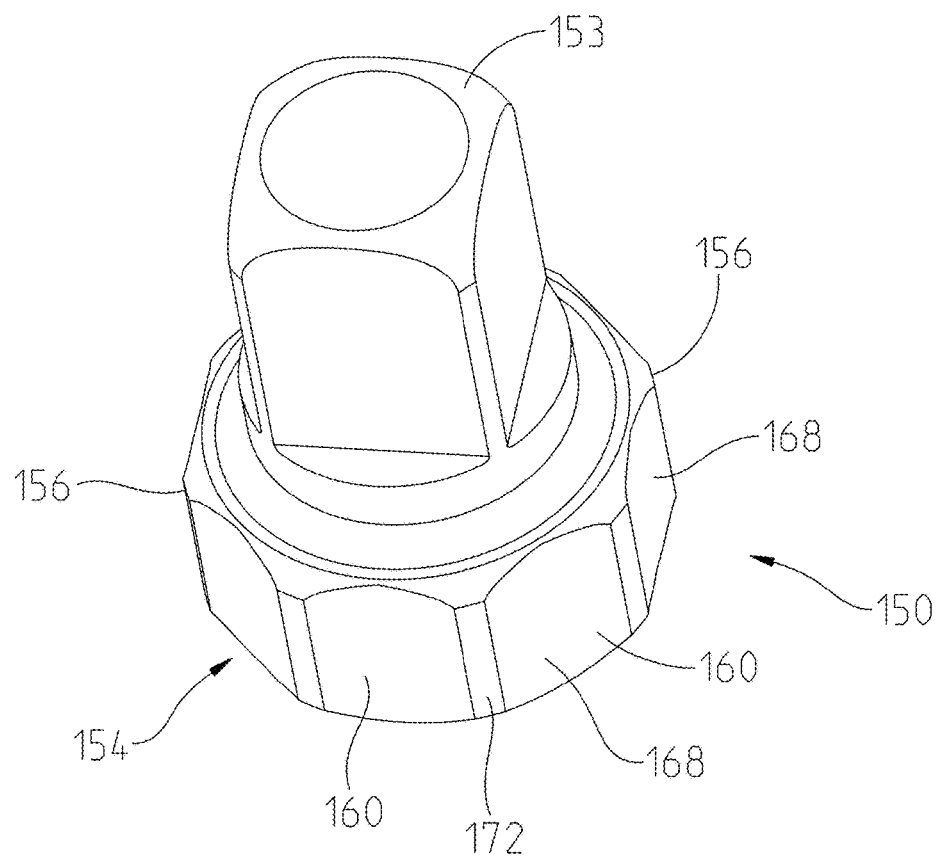
FIG. 12 is a perspective view of a spindle that is a component of the roller clutch of the wrench shown in FIG. 8.
Figure 13:
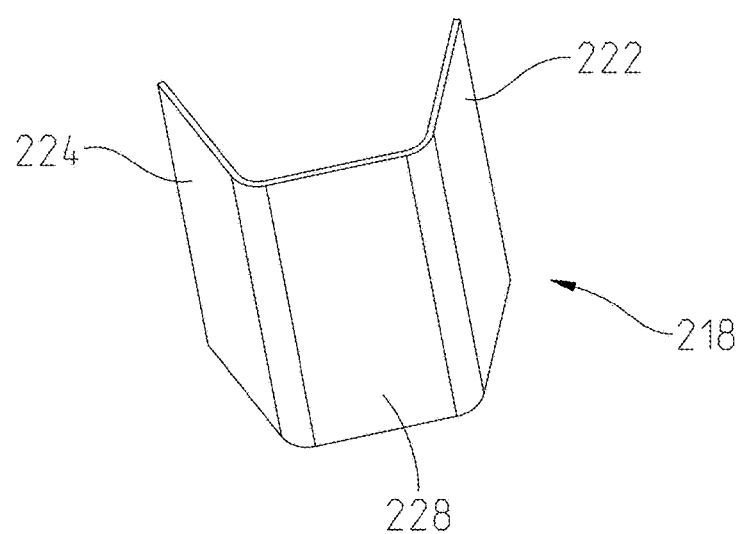
FIG. 13 is a perspective view of a biasing member that is a component of the roller clutch of the wrench shown in FIG. 8.

The head 112 contains a roller clutch 130 contained therein. An exploded view of the roller clutch 130 is shown in FIG. 11. The inside of the head 112 has a chamber 134 that is defined by a cylindrical race 138 that defines the outer boundary of chamber 134. The cylindrical race 138 has grooves 140 for receiving snap rings 142 that serve as retention features for parts installed within the chamber 134 of the head 112. A base plate 146 rests on the snap ring 142 and supports a spindle 150 that rotates within the cylindrical race 138. The spindle 150 has a square drive 153 that extends through the base plate 146. The square drive 153 is a post that extends from the spindle 150. It is contemplated that the square drive 153 may be of other shapes to transmit torque. The spindle 150 has a second race 154 that is opposite the square drive 153 and the second race 154 has a series of lobes 156. The lobes 156 are separated by valleys 160 that are radially nearest a central axis 164 about which the spindle 150 rotates within the cylindrical race 138. Each lobe 156 has an inclined surface 168 that continues from the valley 160 adjacent to a particular lobe 156 to an outer diameter surface 172 that is the radially outermost portion of each lobe 156. Each valley 160 has a pair of inclined surfaces 168 that straddle each valley 160 and lead to two lobes 156 that are spaced from each valley 160. The inclined surfaces 168 are concave as they face the cylindrical race 138. When the spindle 150 is assembled within the head 112, the second race 154 on the spindle 150 is adjacent to and within the cylindrical race 138. In the assembled condition, the valleys 160 are the relatively farthest portion of the second race 154 from the cylindrical race 138. The inclined surfaces 168 that straddle the valleys 160 gradually slope in a direction nearer the cylindrical race 138. The inclined surfaces 168 are concave as they face the cylindrical race 138.

Each valley 160 of the spindle 150 has a roller 152 held adjacent thereto when the spindle 150 is in its installed position within the cylindrical race 154. As stated before, the rollers 152 are cylindrical, but that is not necessarily the only cross-sectional shape that may be used. The rollers 152 are held captive between the cylindrical race 138 and a corresponding valley 160. The rollers 152 are movable from a first position locating each roller 152 relatively near their corresponding valleys 160 and a wedged position or second position where the rollers 152 have moved along an inclined surface 168 far enough to contact both the inclined surface 168 and the cylindrical race 138. Movement of the rollers 152 away from their corresponding valleys 160 along an inclined surface 168 is accomplished by rotating the head 112 and cylindrical race 138 with respect to the spindle 150 in a wedging direction. That wedging direction is set up by a shifting mechanism that locates the rollers 152 on one side of their valleys 160 so that the rollers 152 may only roll along inclined surfaces 168 on one side of the valleys 160.

The shifting mechanism includes a cage 180 having fingers 184 that extend from a base 186. Each of the fingers 184 has a distal end 188 that is opposite the base 186. The distal ends 188 include a slot 190 that extends toward the base 186. The center of the cage 180 includes a hole 195 extending through the base 186. A boss 194 extends upwardly from the base 186 and the hole 195 extends through the boss 194 and into a slot 198. A switch 200 has a shaft 204 that extends through the hole 195 in the boss 194 and allows the switch 200 to be rotated about the shaft 204 when it is installed into the hole 195. The shaft 204 has a triangular boss 208 at its end that is for moving a detent slider 210 within the slot 198. The detent slider 210 has teeth 217 on opposite ends that selectively lock the cage 180 in different positions with respect to the spindle 150. The details of how the detent slider 210 selective locks the cage 180 with respect to the spindle 150 is not described thoroughly herein and is known in the art. More specifically, U.S. Pat. No. 9,958,019 discloses the details of how the detent slider 210 causes the cage 180 to lock with respect to the spindle 150. Rotating the switch 200 causes shifting of the cage 180 and its fingers 184 with respect to the valleys 160. Once the switch 200 shifts the cage 180 to the desired position, the cage 180 and fingers 184 rotate with the spindle. In other words, the fingers 184 remain fixed with respect to the valleys 160 once the switch has located the cage 180 in a desired location. Other mechanisms than the aforementioned use of the detent slider 210 may be used to accomplish the same purpose of keeping the fingers 184 fixed with respect to the valleys 160 during rotation of the spindle 150. Such mechanisms for locking the cage 180 and fingers 184 may involve a spring ball and detent, or other locking features to maintain the location of the fingers 184 with respect to the valleys. Any locking mechanism employed for this purpose should have the desired feature of not releasing the fingers 184 during rotation of the spindle 150. As can be appreciated by the aforementioned description, if the locking mechanism allowed the cage 180 to randomly move during use, the direction of rotation in which the spindle 150 is locked through wedging action could change during use. Such unpredictable behavior would greatly diminish the utility of the ratcheting wrench 100.

Springs 218 are located within the slots 190 of the fingers 184. Each spring 218 has a first cantilevered end 222 and a second cantilevered end 224 that are connected by a bridge 228. The springs 218 are generally U-shaped. The bridges 228 of the springs 218 are slidably held within the slots 190 of the fingers 184 and may shift laterally with respect to the fingers 184 within the slots 190 which guide movement of the springs 218.

Figure 14:
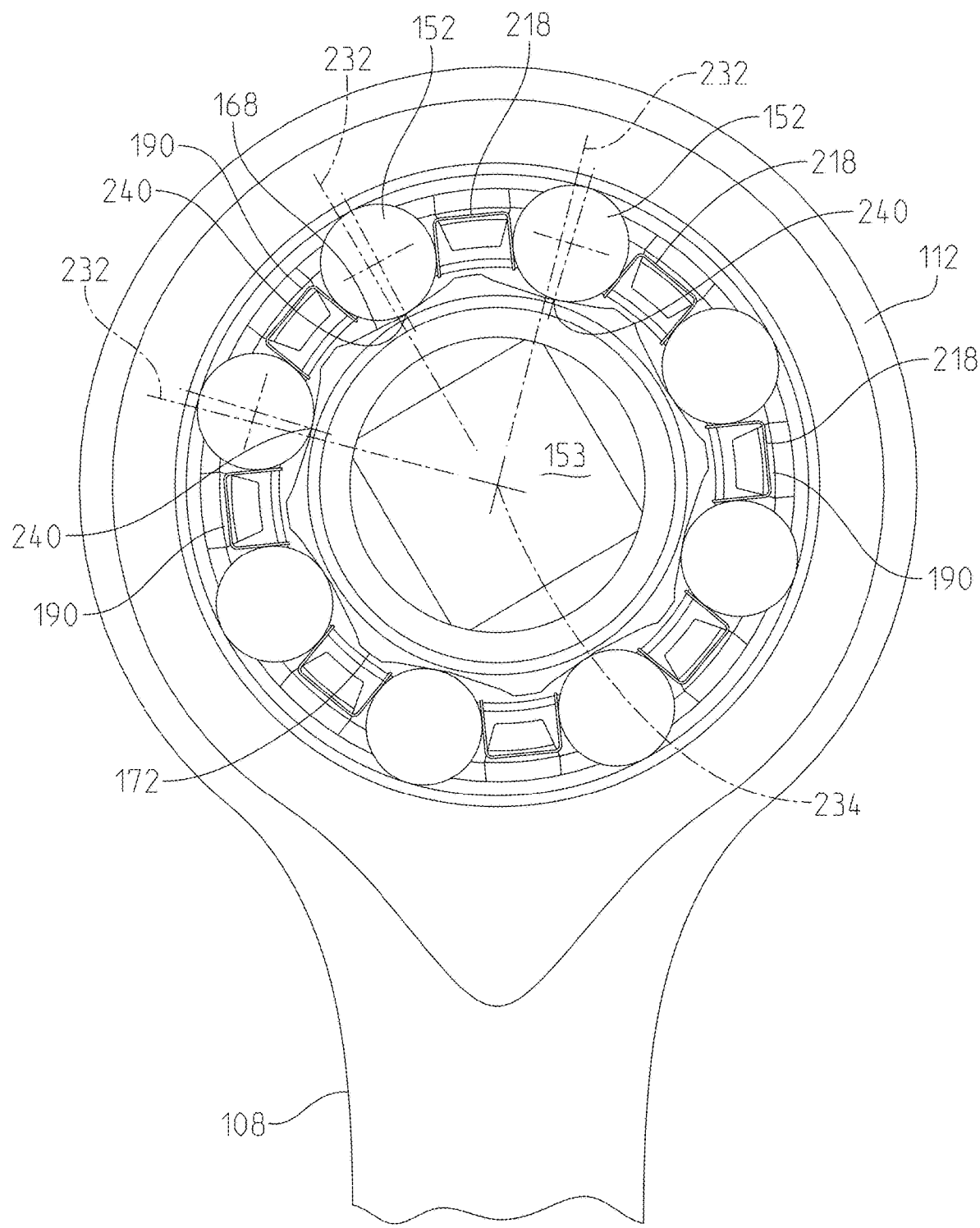
FIG. 14 is a front elevational view of the roller clutch of the wrench shown in FIG. 8 installed in the wrench.
Figure 15:
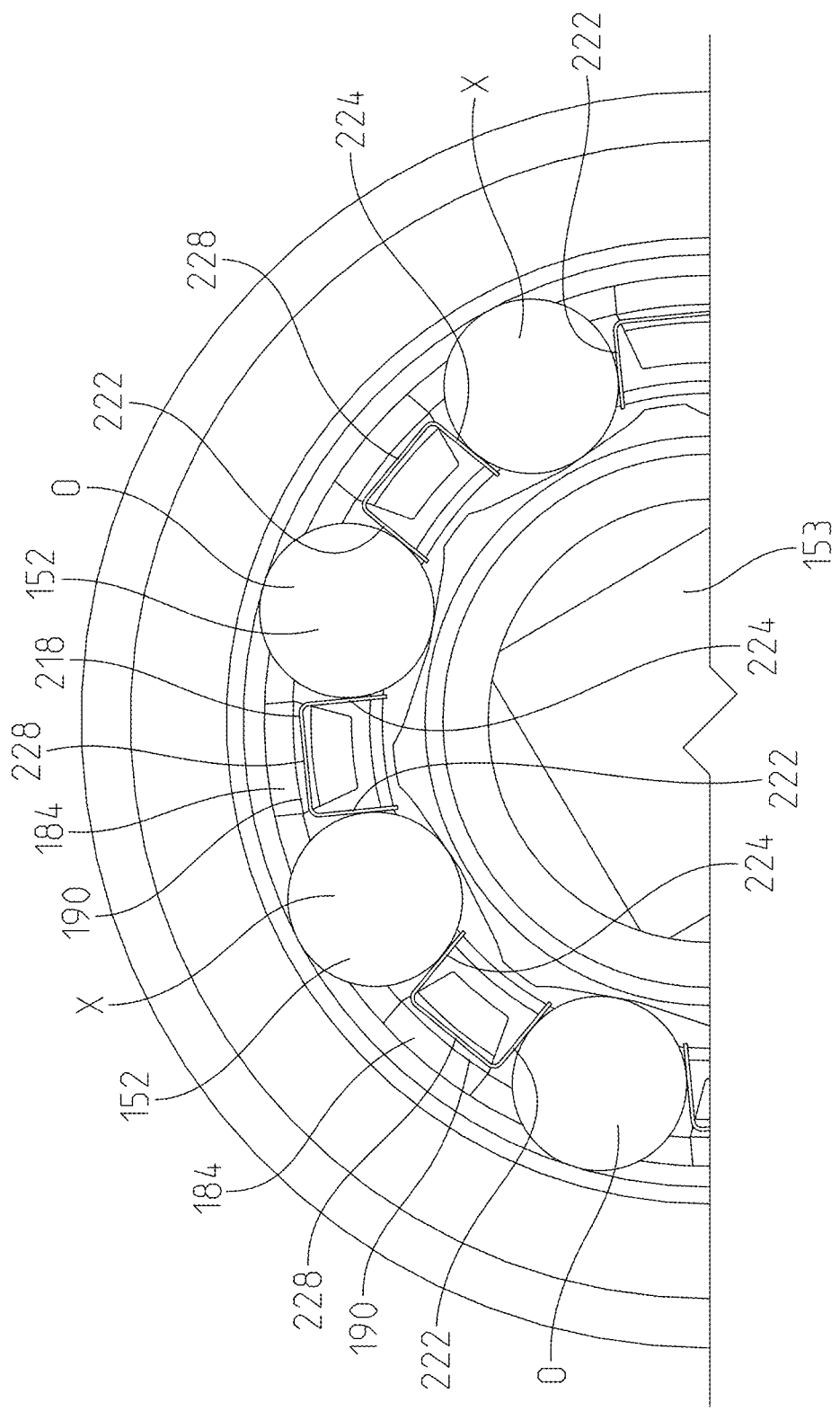
FIG. 15 is a partial front elevational view of the roller clutch of the wrench shown in FIG. 8 installed in the wrench.
Figure 16:
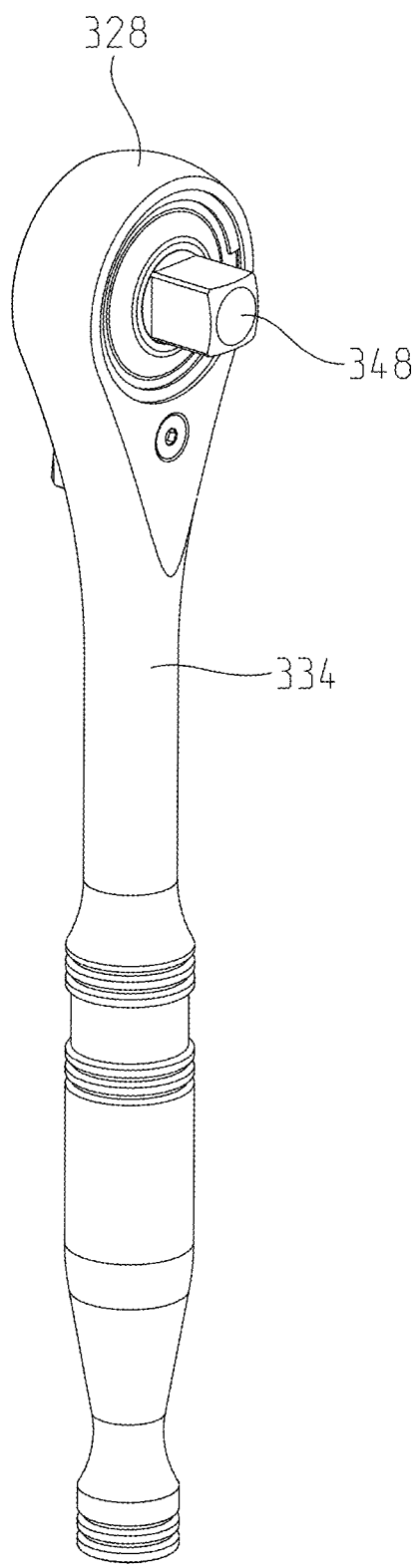
FIG. 16 is a front perspective view of a wrench including a roller clutch according to another embodiment of the present invention.
Figure 17:
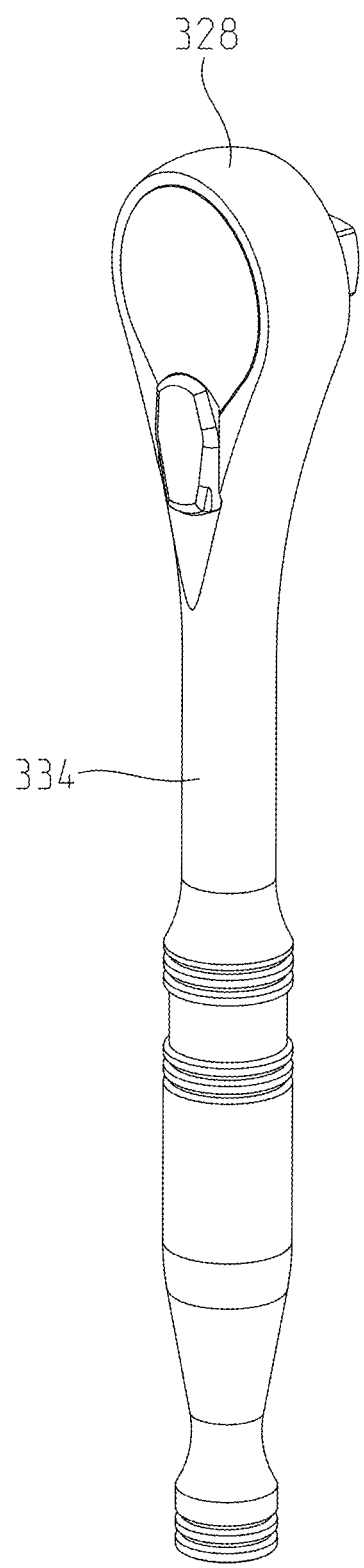
FIG. 17 is a rear perspective view of the wrench shown in FIG. 16.
Figure 20:
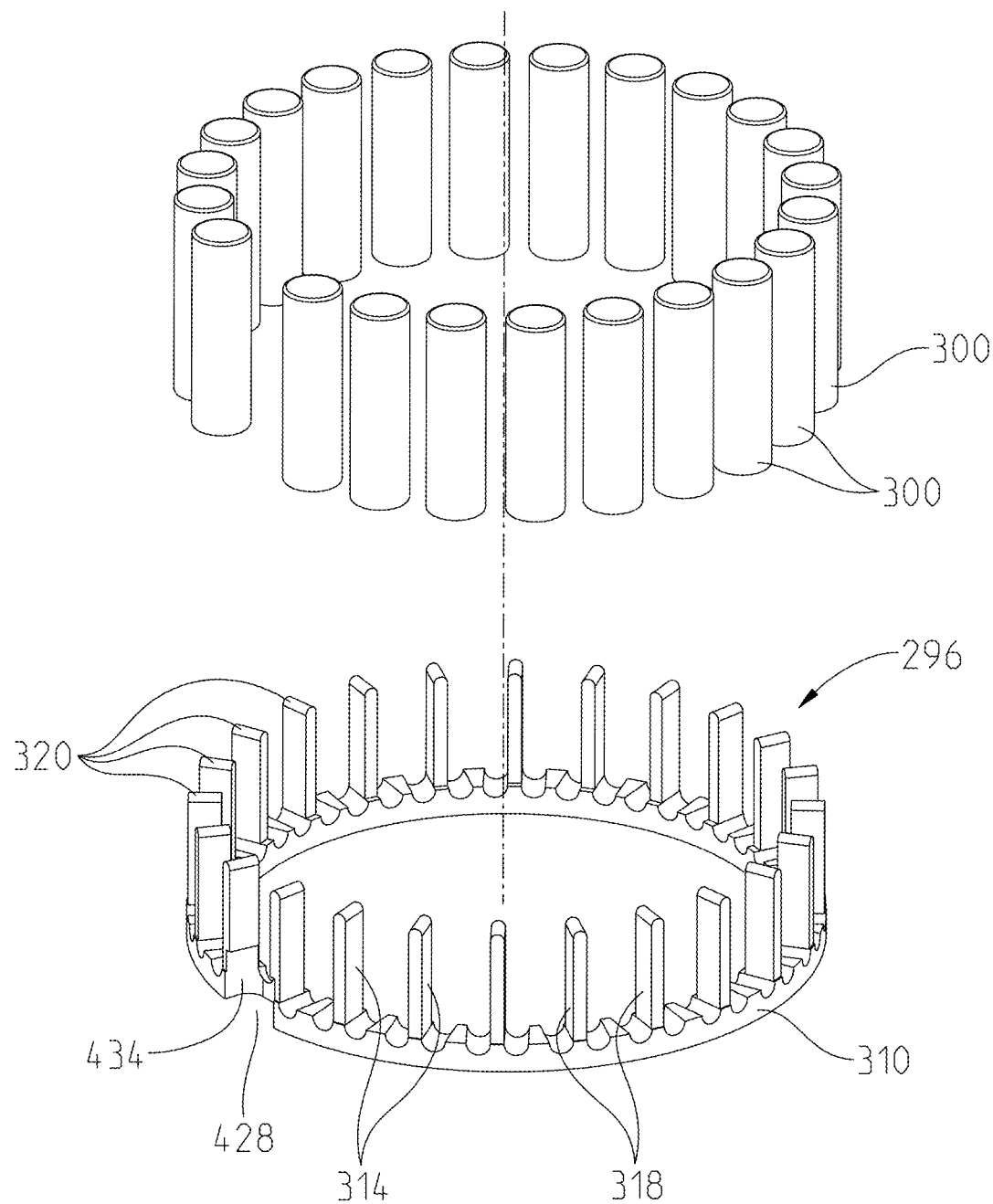
FIG. 20 is an exploded perspective view of rollers and a cage that are components of the roller clutch of the wrench shown in FIG. 16.

An example of how the cage 180 is shifted to locate the fingers 184 in relation to valleys 160 on the second race 154 of the spindle 150 is shown in FIG. 14. For clarity, the valley 160 is the thin area that is the portion of the second race 154 farthest from the cylindrical race 138. Each valley is defined by adjacent inclined surfaces 168 meeting to form the portion farthest from the cylindrical race 138. Lines 232 indicate the specific locations of valleys 160. These lines 232 radiate from the central axis 234 of the spindle 150 about which the spindle 150 rotates. Each finger 184 locates each roller 152 to a point of contact 240 that is shifted from the valley 160 to a particular side. The point of contact 240 shown in FIG. 15 is a starting point or first position that locates each roller's 152 contact with the adjacent inclined surface 168 to a location shifted to one side of the corresponding valley 160. The point 240 of contact is actually a line of contact extending along the length of each roller 152 for its entire contact along the inclined surface 168 of the spindle 150. When the position of the fingers 184 as locked to the spindle 154, that means that the rollers 152 cannot roll backwardly toward the nearest valley 160 and definitely cannot roll further than the nearest valley 160 to ride on the inclined surface 168 on the opposite side of the nearest valley 160 from where it is located. As shown in FIG. 14, this means that the rollers 152 may only roll along the right-hand side valley 160. This starting location, or interchangeably called a first position, sets the wedging direction that locks the spindle 150 within the cylindrical race 138 through the wedging action of the rollers 152 between the inclined surface 168 and cylindrical race 138. In the case shown in FIG. 14, rotating the head 112 via turning the handle 108 in a clockwise direction is the wedging direction that will cause the rollers 152 to wedge between the inclined surface and cylindrical race 138 and thereby impart torque to the spindle 150 that is connected to a socket or other attachment to impart torque on a fastener connected to the spindle 150. Rotation of the handle in the counterclockwise direction, as shown in FIG. 14, will release the rollers 152 from their wedged engagement and allow free rotation of the spindle 150. The switch 200 may be used to selectively lock the cage 180 so that the fingers 184 locate the starting or first position of the rollers 152 to the other inclined surface 168 on the opposite side of the valleys 160 to that shown in FIG. 14. As such, the wedging direction of the spindle 150 will be reversed from that shown in FIG. 14.

Ideally, the rollers 152 will engage in the wedging direction simultaneously with perfect synchronicity. Simultaneous engagement requires a spindle 150 having exactly uniform inclined surfaces 168, with rollers 152 that are exactly the same, shifted by perfectly uniform fingers 184 located exactly the same distance from their corresponding valleys 160. However, manufacturing to perfection is unrealistic, and attempting to achieve overly tight tolerances will yield a mechanism that is prohibitively expensive to manufacture. Therefore, a load balancing mechanism is employed to facilitate near simultaneous engagement of the rollers 152 against both races 138, 154 under realistic manufacturing tolerances. The load balancing mechanism also achieves nearly uniform loading of the rollers 152 when they are wedged through movement of the races 138, 154 in the wedging direction. Simultaneous engagement minimizes dead travel in the wedging direction so that as soon as the handle 108 is turned in the wedging direction, torque is applied.

The load balancing mechanism includes the springs 218 mentioned above which balance load and facilitate simultaneous engagement of the rollers 152. FIG. 15 illustrates how the load balancing mechanism functions. Under realistic manufacturing tolerances, the rollers 152 may not simultaneously wedge or engage between the inclined surfaces 168 and the cylindrical race 138. FIG. 15 shows that some of the rollers 152 marked with the letter O are not engaged and other rollers 152 that are engaged are marked X. The wedging direction in FIG. 15 is the same as that in FIG. 14. As such, rotation of the cylindrical race 138 with respect to the inclined surfaces 168 in the clockwise direction will cause wedging engagement of the rollers 152 between the cylindrical race 138 and the inclined surface 168. When particular rollers 152, such as those marked X in FIG. 15, enter wedging engagement slightly ahead of other rollers marked with O, the engaged rollers 152 (marked X) will press on a first cantilevered end 222 of a spring 218 contacting that particular engaged roller (marked X) 152. As shown in FIG. 15, this will cause the spring 218 to shift in its slot 190 with the finger 184 that holds it. This shifting of the spring 218 will urge an adjacent roller 152 (marked O) that is not fully engaged to be urged in wedging contact as the bridge 228 shifts and force is exerted between the first cantilevered end 222 and through the second cantilevered end 224. In this manner if certain rollers 152 such as those marked X enter wedging engagement slightly ahead of rollers 152 marked O, the springs 218 will urge the rollers 152 marked O to catch up and enter wedging engagement nearly simultaneously. As such, in cases where there are slightly different rates of wedging engagement amongst the rollers 152 due to tolerances, the springs 218 will still provide near simultaneous wedging engagement of rollers 152 when the spindle 150 and had 112 rotate in a wedging direction. When the handle 108 is used to rotate the cylindrical race 138 within the head 112 in the counterclockwise direction as shown in FIG. 15, the rollers 152 will be released from wedging engagement. Additionally, the energy stored in the springs 218 will be released so that the rollers 152 will be able to rotate freely when the handle 108 is rotated in the free rotating direction. As can be appreciated from the description above, using the switch 200 to locate the fingers 184 on the opposite sides of the valleys 160 will change the wedging and free rotating direction as well as reverse the interaction of the springs 218 with the rollers 152. Thus, in either direction that is selected to transmit torque (wedging direction), near simultaneous engagement of the rollers 152 will be achieved as well as near simultaneous release of the rollers 152 in the free rotating direction. Thus, the switch 200 and fingers 184 act as parts of a shifting mechanism that is used to choose the wedging direction, and the springs 218 within the fingers 184 act as a load balancing mechanism.

Although the springs 218 may serve as a load balancing mechanism, load balancing may be achieved as shown in FIGS. 16-25. Roller clutch 290, as shown in exploded view FIG. 18, includes a cage 296 that acts as a load balancing mechanism to facilitate simultaneous engagement of rollers 300 that are held within the cage 296. The cage 296 also acts as a shifting mechanism as will be described below. Cage 296 has a base 310 with a plurality of fingers 314 extending away from the base 310. The fingers 314 have a proximal end 318 that is attached to the base 310 and a distal end 320 that is spaced from the base 310 in a cantilevered manner. The cage 296 is designed to be assembled with a head 328 of ratcheting wrench 332. A handle 334 is connected to the head 328.

A spindle 340 includes a cylindrical race 344 and a square drive 348 that extends opposite the cylindrical race 344. The cylindrical race 344 is the outside surface on the spindle body 346. The spindle body 346 includes a hole 350 for receiving a spring 354 that may press on a catch ball 358 that is used for retaining a socket on the square drive 348. The spindle 340 is held into the head 328 on one side by a front cover 349 and snap ring 351 and the other side by a back cover 353.

The head 328 of the ratcheting wrench 332 has a second race 366 having a plurality of valleys 370 separated by ridges 374. The valleys 370 are areas of the second race 366 that are radially farthest from the cylindrical race 344 when the cylindrical race 344 is assembled within the second race 366 so that the second race 366 surrounds the cylindrical race 344. Each valley 370 is an area straddled on both sides by adjacent inclined surfaces 376. As mentioned above, the inclined surfaces 376 may be concave as they face the cylindrical race 344. When the cylindrical race 344 is within the second race 366, rollers 300 are held between the cylindrical race 344 and the inclined surfaces 376. The inclined surfaces 376 slope toward the cylindrical race 344 so that movement of a roller 300 along the inclined surfaces 376 away from the valleys 370 in either direction locates it nearer the cylindrical race 344 until each roller 300 ultimately contacts both the inclined surface 376 and the cylindrical race 344. The rollers 300 are movable from a first position locating each roller 300 relatively near their corresponding valleys 370 and a wedged or second position where the rollers 300 have moved along their inclined surface 376 far enough to contact both the inclined surface 376 and the cylindrical race 344. Movement of the rollers 300 away from their corresponding valleys 370 along an inclined surface is accomplished by rotating the second race 366 with respect to the spindle 340 in a wedging direction. That wedging direction is set up by shifting of cage 296 to purposefully locate the rollers 300. The wedging direction is set by locating the rollers 300 on one side of their corresponding valleys 370 so the rollers 300 may only roll along inclined surfaces 376 on one side of the valleys 370.

The cage 296 acts as part of the overall shifting mechanism which includes a switch 390 that pivots about a screw 394 that extends through the head 328, as shown in FIG. 18. The screw 394 is threaded into a hole 396 in pivot post 400 so that the switch 390 may pivot about axis 406 that is through the center of the pivot post 400 and screw 394. The switch 390 has a shifting post 408 that extends downwardly into the head 328 so it may shift the cage 296. The switch 390 has a detent ball 410 that is urged into a detent pocket 418 in the switch 390 with a spring 419 to selectively lock its location. The shifting post 408 extends into a shifting slot 428 in the base 310 of the cage 296. Pivoting of the switch 390 causes the fingers 314 of the cage 296 to be selectively restrained with respect to the valleys 370 on a chosen side of the valleys 370. The fingers 314 are restrained with respect to the valleys 370 within a limit defined by the shifting slot 428 in the base 310. Lateral sides 434 of the shifting slot 428 allow the cage 296 and its fingers 314 to move rotationally within the limit defined by the distance it takes the lateral sides 434 of the shifting slot 428 to contact the shifting post (this distance is indicated as W in FIG. 23) because the shifting post 408 is selectively fixed with respect to the second race 366 via the interaction of the detent ball 410 with the switch 390. It is contemplated that the shifting post 408 may be fixed with respect to the second race 366 and valleys 370 thereon so that the shifting post 408 not be moveable. A fixed shifting post may be desirable when single wedging direction for transmitting torque is desired.

In general, it should be noted that the cage 296 is restrained with respect to the race having valleys, which in this case happens to be the second race 366 which is an outer race that circumscribes the inner cylindrical race 344 on spindle 340, and then used with cage 296. It is contemplated that cylindrical race 344 could be reversed so that it is an internal race on the head 328 and the valleys could be located on the spindle 340. Such a configuration is illustrated in FIG. 11, however, the cage 180 is somewhat different than cage 296.

Figure 21:
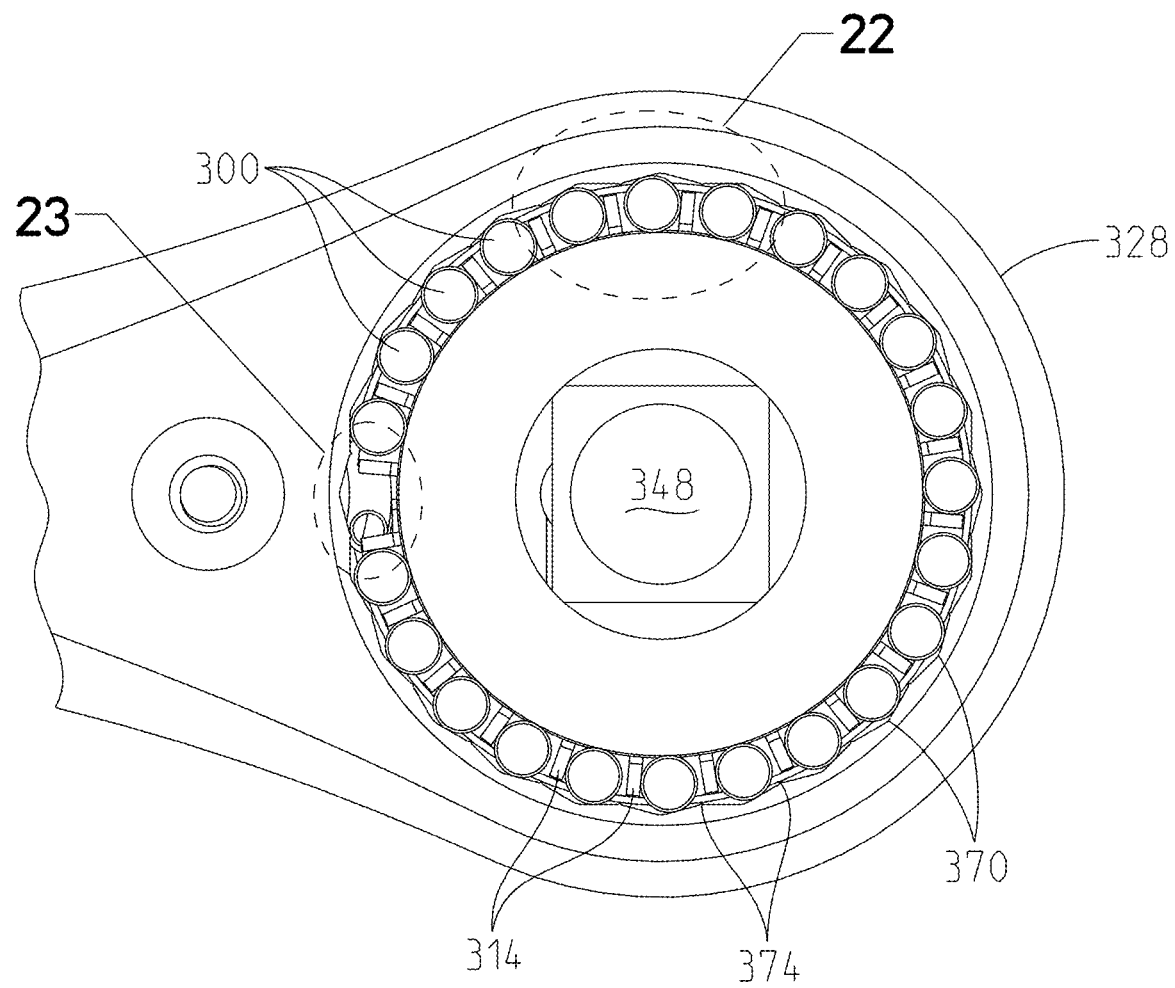
FIG. 21 is a front elevational view of the roller clutch of the wrench shown in FIG. 16 installed in the wrench.
Figure 22:
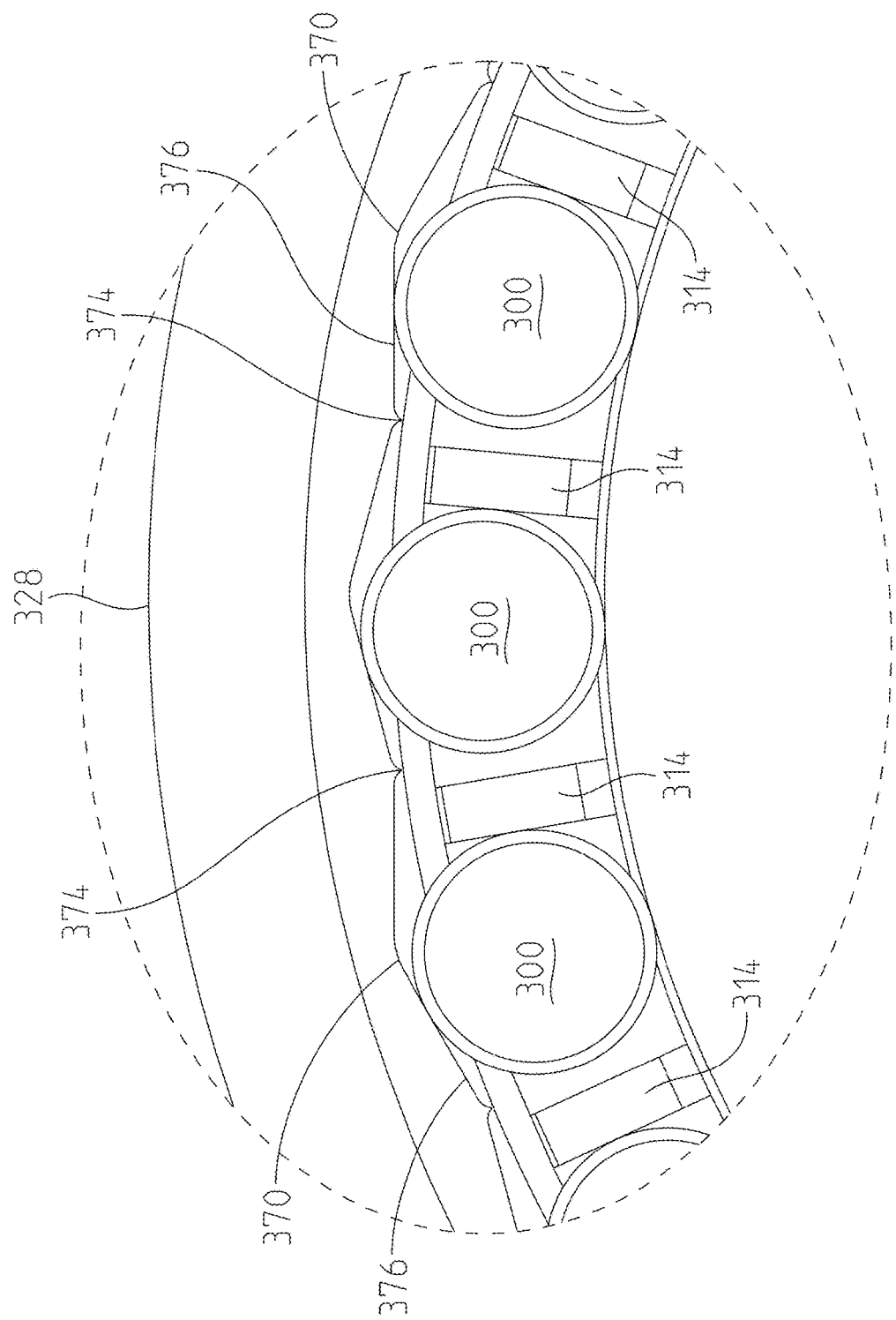
FIG. 22 is a partial front elevational view of the roller clutch of the wrench shown in FIG. 16 installed in the wrench.
Figure 23:
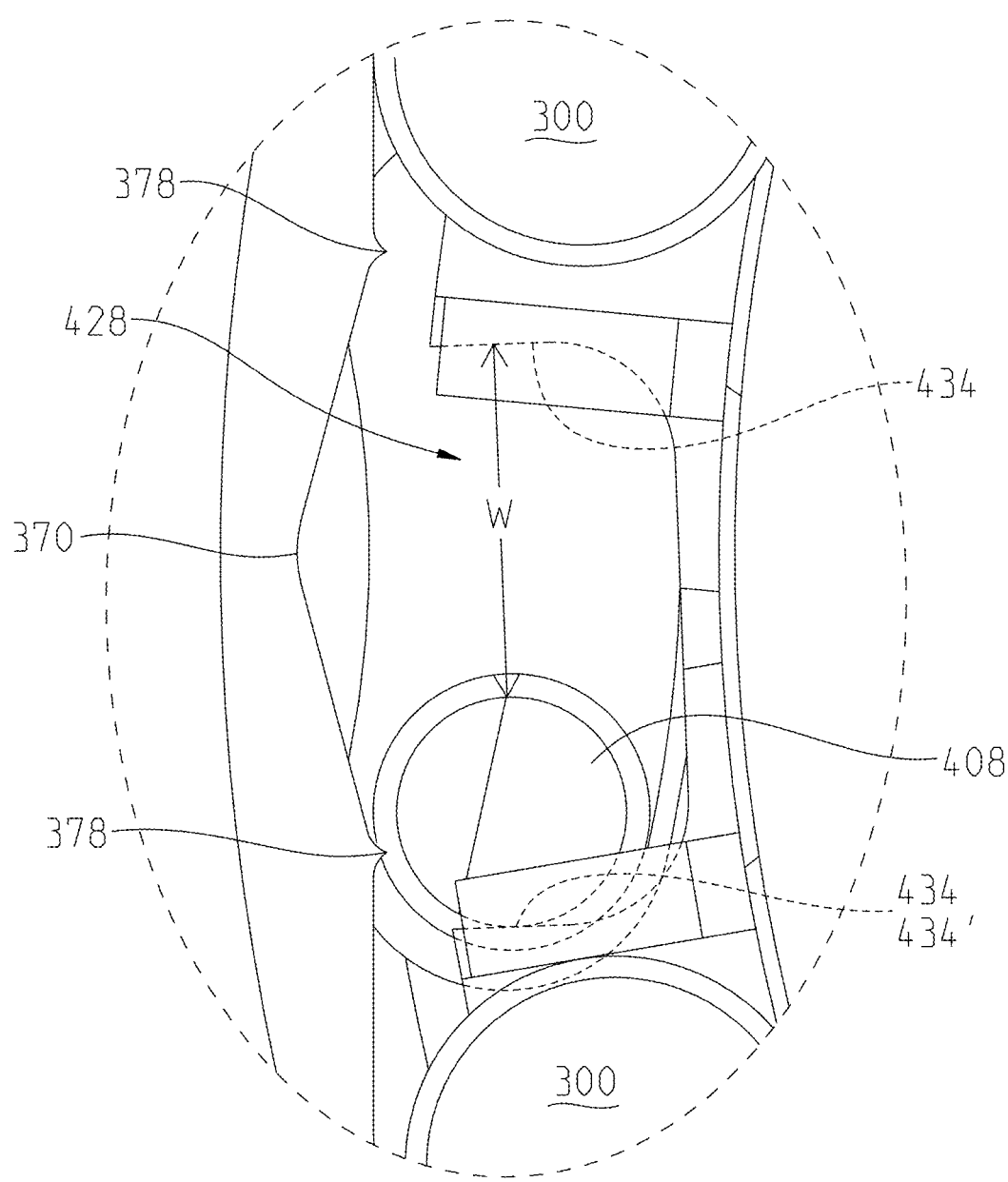
FIG. 23 is a partial elevational view illustrating the relationship between portions of a switch and cage that are components of the wrench shown in FIG. 16.

Pivoting the switch causes the shifting post to bear against one of the lateral sides 434 of the shifting slot 428. In this condition where the shifting post 408 bears against one of the lateral sides 434 of the shifting slot 428 the cage 296 may be further rotated in the direction in which the shifting post urges the cage 296. FIGS. 21-24 explain how this relationship functions as well as illustrate the importance of how this action allows the cage 296 in conjunction with the switch 390 to be both a shifting mechanism to determine wedging direction and be a load balancing mechanism. FIG. 21 illustrates the cage 296 positioned so that rotating the head 328 and second race 366 wedges the rollers 300 into the inclined surfaces 376 on the left side of the valleys 370 as viewed in FIG. 21. Thus, the wedging direction for applying torque is done by rotating the handle 334 in the clockwise direction and the free rotating direction is counterclockwise. FIG. 22 shows a magnified view of the rollers 300 interacting as shown in FIG. 21 and the positioning of the fingers 314 in that condition. FIG. 23 shows the shifting post 408 bearing on the left lateral side 434 of the shifting slot 428. This position shifts the rollers 300 as described above to set the wedging direction, yet will allow rotation of the cage 296 and its fingers 314 counterclockwise until the shifting post 408 contacts the right lateral side 434 of the shifting slot 428.

Figure 24:
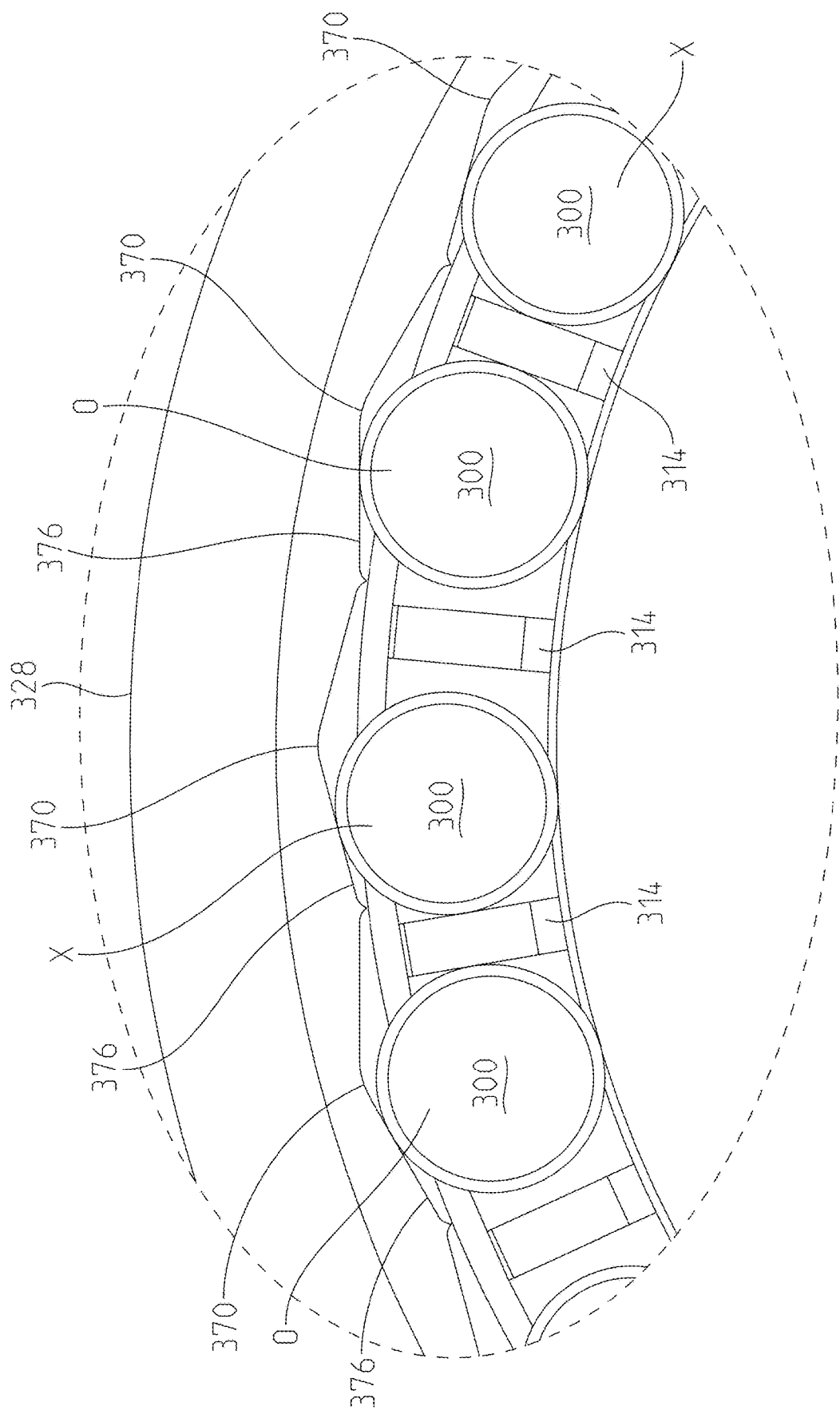
FIG. 24 is a partial front elevational view of the roller clutch of the wrench shown in FIG. 16 installed in the wrench and with torque applied to the wrench.
Figure 25:
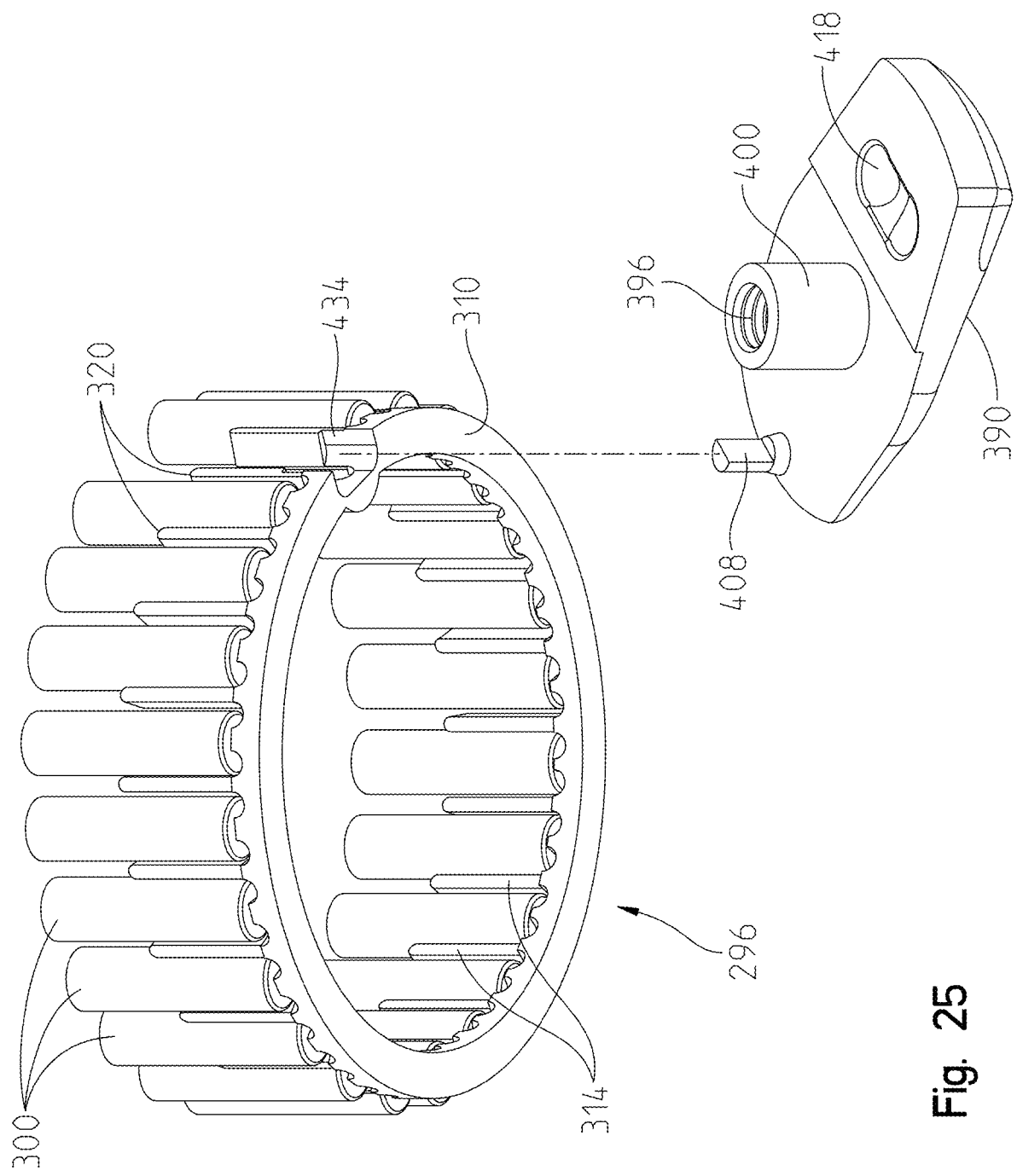
FIG. 25 is a perspective view of a switch and cage that are components of a wrench and roller clutch according to another embodiment of the present invention.
Figure 26:
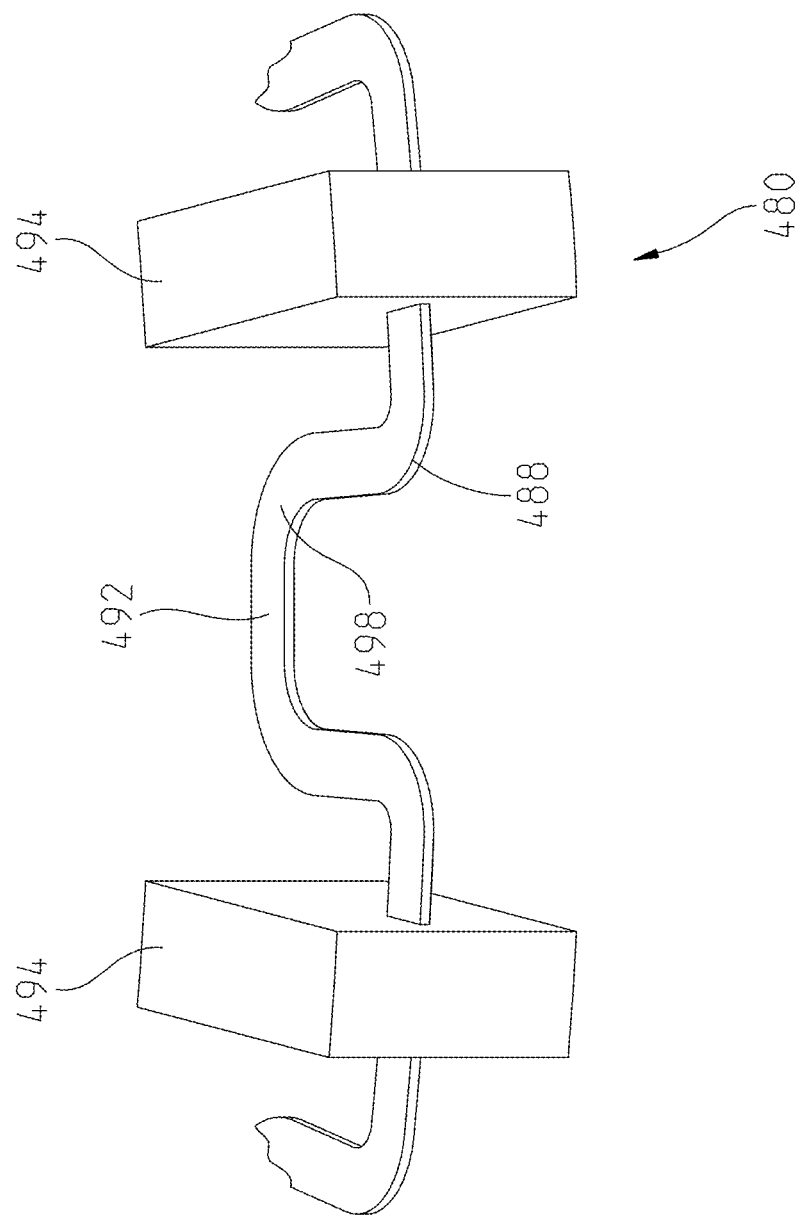
FIG. 26 is a perspective view of a section of a cage that is a component of a roller clutch according to another embodiment of the present invention.

The load balancing function of the cage 296 is best seen in FIG. 24. Some of the rollers marked X are sufficiently engaged between the cylindrical race 344 and the inclined surfaces 376 of the second race to transmit torque due to the wedging action from rotating the inclined surfaces 376 in the clockwise wedging direction set up by the cage 296 and switch 390. As the rollers 300 marked X engage before the rollers 300 marked O, the rollers 300 marked X will urge the fingers 314 adjacent to them on the left in a counterclockwise direction to push on the rollers 300 marked O and thereby urge the rollers 300 marked O into engagement. Movement of the cage 296 and fingers 314 in a counterclockwise direction is possible because room exits within the shifting slot 428 so that it may move off of the shifting post 408 toward the right lateral side 434 of the shifting slot 428. The cage 296, as shown in FIG. 23, may move counterclockwise off the shifting post 408 as it contacts a starting side 434' of the shifting slot 428. This movement is one way in which the cage 296 may facilitate load balancing amongst the rollers 300. Another way in which the cage 296 may balance load and encourage simultaneous engagement of all rollers 300 is through bending of the fingers 314. If a finger 314 contacts a roller 300 that is engaging ahead of another, that first engaging roller 300 may bend the finger 314 near its proximal end 318 and cause the distal end 320 to augment the movement through cantilevered action to impinge on an adjacent roller 300. So, the cage 296 may encourage simultaneous engagement of all rollers 300 through shifting of the entire cage 296 and bending of individual fingers 314. As such the cage 296 may accommodate significant tolerance variation between adjacent rollers 300 as well as non-adjacent rollers 300 by bending and shifting.

Selection of the dimensions of the components interacting with the cage 296 are governed by specific relationships to achieve desired outcomes during use. When the switch 390 is rotated into one of its detent positions by moving the switch left or right the shifting post 408 will contact a lateral side 434 of the shifting slot 428. This initial contact of the shifting post 408 after moving the switch to one of its detent positions is a starting side 434' of the shifting slot 428 and may be either the left or right lateral side 434. FIG. 23 shows the starting side 434'. There is a desired minimum distance W between the shifting post 408 of the switch 390 and the opposite lateral side 434 of the shifting slot 428 to which the shifting post 408 is contacting when the switch is located in one of its selectively locked detent positions. Considering the load balancing and simultaneous engagement the cage 296 imparts in FIG. 24, the distance W is selected so that the shifting slot 428 is wide enough so that the cage 296 can rotate sufficiently to urge all rollers 300 into wedging contact before the cage 296 is stopped on the shifting post 408 by contacting the opposite lateral side 434 to the starting side 434'. For example, in FIG. 23, the starting side 434' is the left lateral side 434. The minimum distance W must be to allow the necessary rotation of the cage 296 and is determined as follows:

$$W = 0.35 Tc$$

Where Tc is the desired circumferential travel of the cage 296 calculated as follows:

$$Tc = (\Theta/360) \times C$$

Where Θ is the desired relative angular rotation between the spindle 340 and the head 328 and where C is the circumference of a circle through the centers of the rollers 300 centered at the center of the spindle 250. Θ is determined by (a) determining the differences between the angular rotation of the free end of handle 334 at a specified torque (such as 100% of torque for a given wrench size as determined by the American National Standards Institute ("ANSI") minus the square drive 348 rotation at that torque, and (b) subtracting from that the contribution of the angular rotation of the free end of the handle 334 (including any contribution due to flexing or bending of the handle 334). For example, utilizing ANSI standards for a ⅜-inch wrench, the difference between the rotation of the free end of the handle 334 and the square drive 348 is 14.5 degrees, and the contribution due to rotation of the free end of the handle 334 (including any contribution due to flexing or bending of the handle 334) is 6.5 degrees. This results in Θ=8 degrees.

C may be calculated as follows:
C=Pi(SD+RD) where SD is the spindle 340 diameter at the cylindrical race 344, and RD is the roller 300 diameter.

The desired range of G (spacing of fingers 314 from rollers 300) is:

$$0.05(RD) \le G \le 0.2(Tc)$$

Applying these formulas to a ⅜ inch ratcheting wrench 332 having the following component dimensions (for example):

$$\Theta = 8 \text{ degrees}$$
$$SD = 0.0984 \text{ inch}$$
$$RD = 0.0984 \text{ inch}$$

$$C = 3.162 \text{ inch}$$
$$Tc = 0.070 \text{ inch}$$
$$0.0049 \text{ inch} \le G \le 0.014 \text{ inch}$$
$$W = 0.0245 \text{ inch minimum}$$

The shifting mechanism, as described above using a switch 390 and a shifting post 408, may be accomplished by other similar mechanisms. For instance, the shifting post 408 on the switch 390 as shown in FIG. 18 interacts with the shifting slot by engaging in the shifting slot 428 as shown in FIG. 23. The shifting post 408 enters the shifting slot 428 by entering into the base 310 of the cage 296 perpendicular to the bottom of the base 310 opposite the fingers. It is also contemplated that a shifting post could enter into the shifting slot 428 laterally. This would be perpendicular to how the shifting post 408 enters the shifting slot 428 as shown in FIG. 23. It may be possible to shift the cage 296 with other mechanism than those described above that accomplish their same function, namely shifting the cage 296 to a particular side of the valleys 370 so that the wedging direction may be selected, yet still allow some restrained motion of the cage 296.

The cage 296 shown above is not the only kind of cage that may be useful in the present invention. Cage 480 is a different kind of cage that may be used in the place of cage 296. Cage 480 includes a base 488 having fingers 494 connected thereto. The base 488 has U-shaped members 492 that span between the fingers 494 to connect the fingers 494. Each member 492 has a curved section 498. Rollers 300 may fit between the fingers 494 of cage 480 in the same manner as cage 296 described above. The cage 480 is shifted in the same manner as cage 296. Cage 480 provides the opportunity for additional flexing of the members 492 between the fingers 494 to a degree that is more than the substantially more rigid base 310 of cage 296. This additional flexibility within cage 480 allows adjacent rollers 300 to urge an adjacent roller 300 to a greater degree than in cage 296. Further, cage 480 will not require as much reliance on the cantilevered action described in cage 296. In this manner the load balancing effect of having relative movement between the fingers 494 may be enhanced by selecting the characteristics of the members 492 to provide a desired amount of relative movement between fingers 494.

Figure 27:
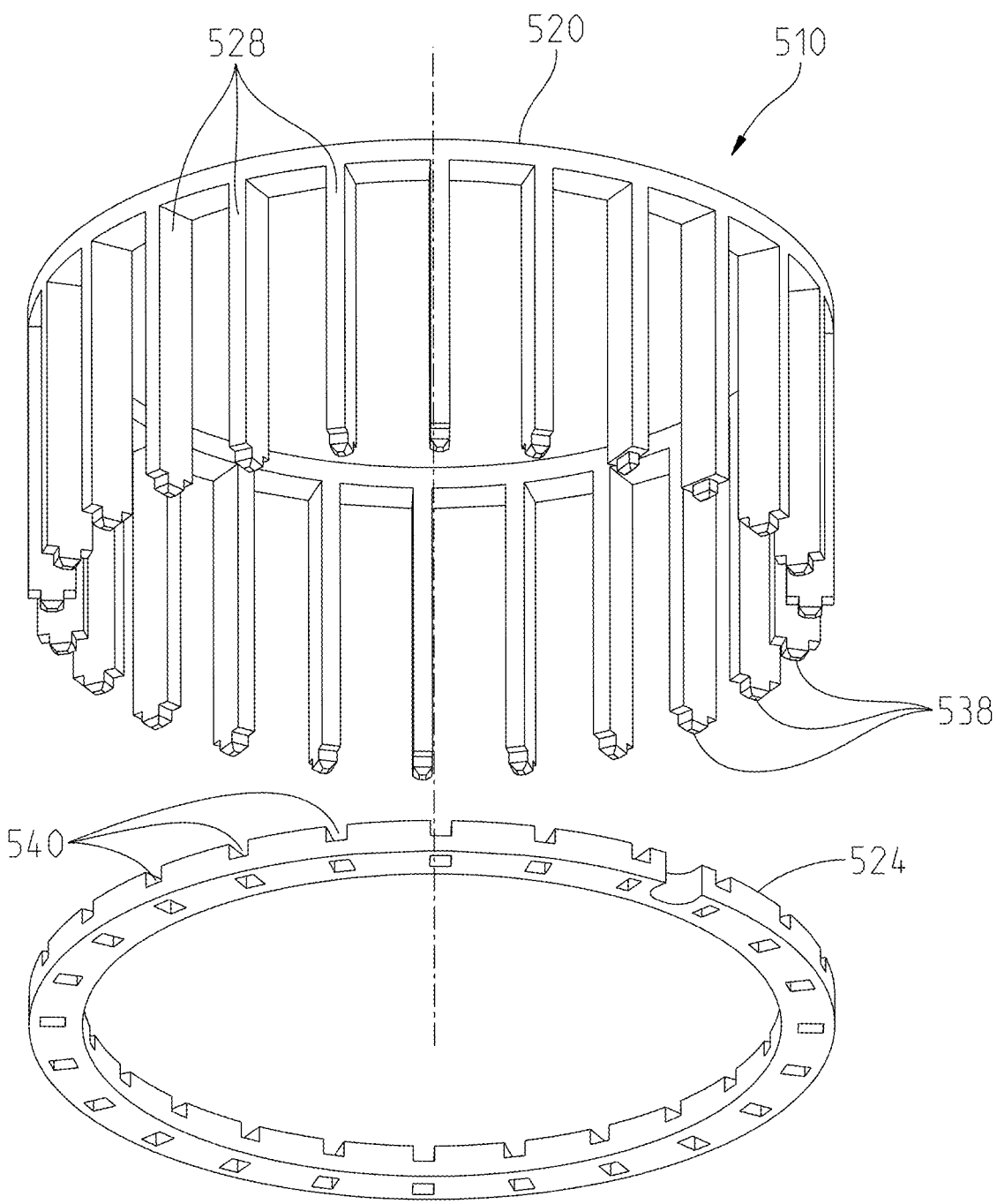
FIG. 27 is an exploded perspective view of a cage that is a component of a roller clutch according to another embodiment of the present invention.
Figure 28:
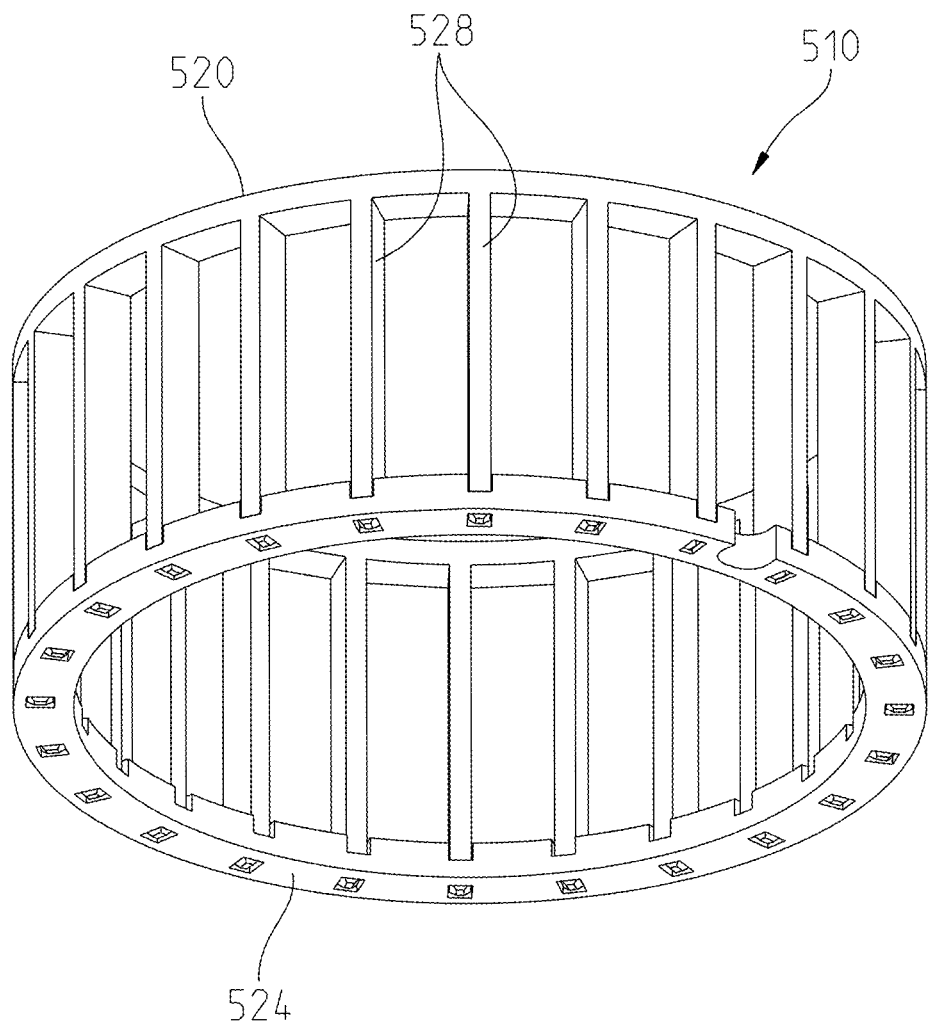
FIG. 28 is a perspective view of the cage shown in FIG. 27

Another example of a cage 510 is shown in FIGS. 27 and 28. This cage 510 is much like cage 296, however, cage 510 has a first base 520 and a second base 524. The first and second bases 520, 524 are spanned by a plurality of fingers 528 that accommodate rollers 300 between them. As shown in FIGS. 27 and 28, each finger 528 may have a tang 538 that extends into a notch 540. Cage 510 is useful for more flexible materials that would have too much of the cantilever effect described in cage 296.

Generally speaking, the present invention will allow load balancing amongst rollers 66, 152, 300, 300 so that they bear equally on their respective races 34, 48; 138, 154; 344, 366 and simultaneously wedge in locking engagement. When a cage 180, 296, 480, 510 is used, the cage of the present invention serves the function of shifting the rollers 152, 300, 300 so they wedge on a particular inclined surface 168, 376 that is on a desired side of a corresponding valley 160, 370 to set the wedging direction and thereby choose the locking direction and free rotating direction. The cages 108, 296, 480, 510 not only have the shifting function, but have the additional and separate function of load balancing. This load balancing function facilitates simultaneous engagement of all rollers 152, 300, 300 so that the forces imparted on all rollers 152, 300, 300 are nearly identical.

Cage 180 is selectively fixed with respect to its second race 154 to provide the shifting function. The springs 218 act as a shiftable part of the fingers 184 that hold them. In this manner the springs 218 acting as movable portions of the fingers 184 allow controlled and differential movement of the rollers 152 after the cage 180 is selectively locked to facilitate load balancing.

Cages 296, 480, and 510 facilitate load balancing in two ways. A first way is relative movement of the entire cage 296, 480, and 510 in a restrained manner through use of the shifting slot 428 with respect to the shifting post 408 that restrains the cages 296, 480, and 510 with respect to their corresponding second race 154, 366. This allows some movement to shift loads from rollers 152, 300, 300 that have wedged into engagement earlier to rollers 152, 300, 300 that have not yet engaged. Cages 296 and 480 also allow relative movement of the fingers 314, 494 with respect to the cage 296, 480 as a whole. As described above fingers 314, 494 may move in bending via their cantilevered nature, or in the case of cage 480, the fingers may have some relative movement due to flexing of the U-shaped members 492. As such cages 296, 480 can facilitate load balancing via movement of the entire cages 296, 480 or relative movement of the fingers 314, 494 within the cages 296, 480.

Figure 29:
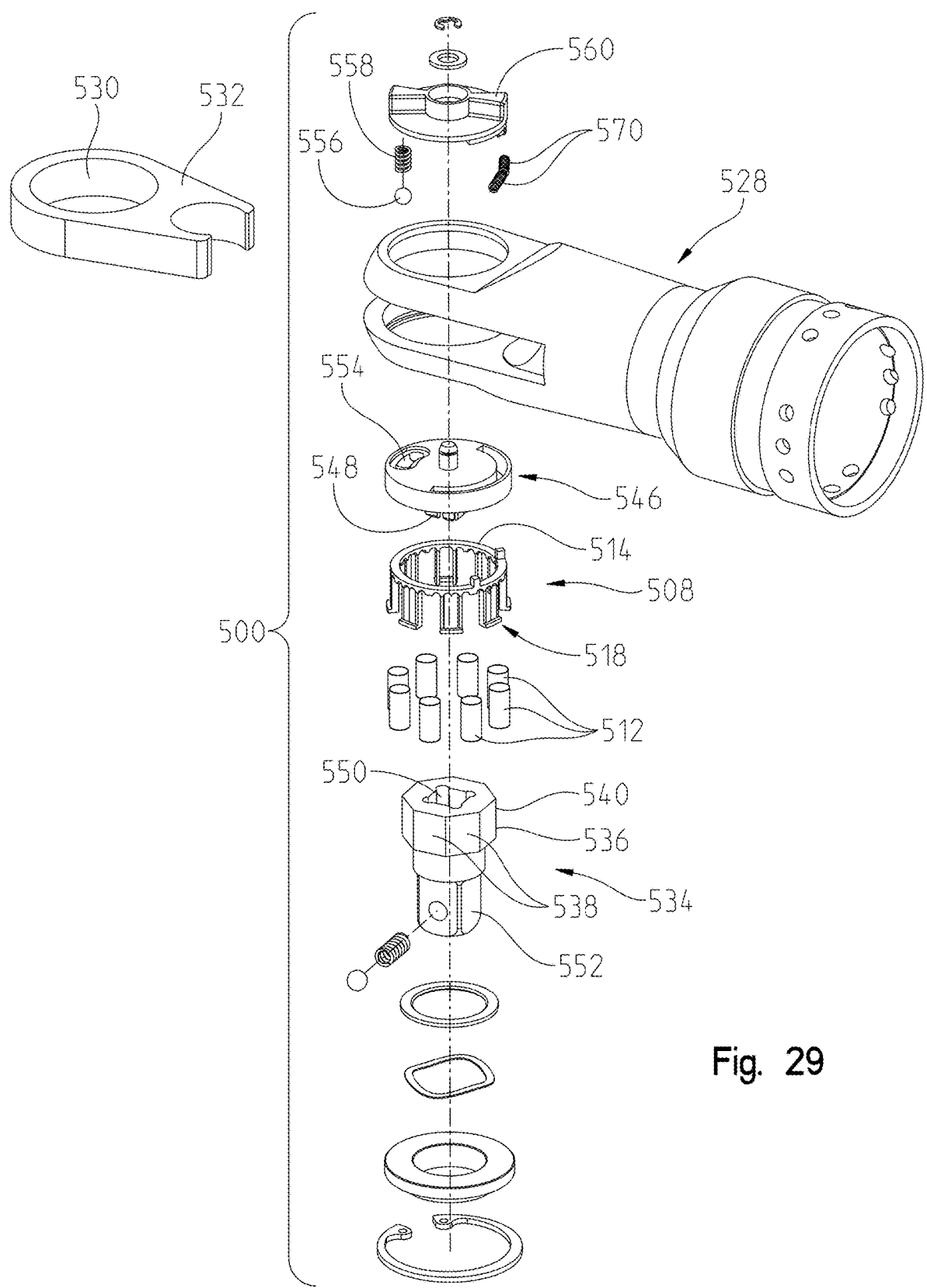
FIG. 29 is an exploded view of a roller clutch having a faceted race and a cylindrical race.

FIG. 29 shows an exploded view of roller clutch 500. This roller clutch 500 includes a cage 508 that acts as a load balancing mechanism to facilitate simultaneous engagement of rollers 512 that are held within the cage 508. The cage 508 acts as part of a shifting mechanism in conjunction with other parts as will be described below. Cage 508 has a base 514 with a plurality of fingers 518. The fingers 518 each have a pair of riser bars 520 that are joined by a bridge 522 that is opposite to the base 514 of the cage 508. The fingers 518 have a proximal end 524 that is attached to the base 514 and a distal end 526 that corresponds to the location of the bridge 522. The fingers 518 and the corresponding riser bars 520 that make up the fingers 518 extend from the base 514 in a cantilevered manner. The cage 508 is assembled within a head 528 that includes a cylindrical race 530 that is an interior portion of a yoke 532. The yoke 532 is made to pivot within the head 528 about the center of the cylindrical race 530 by a reciprocating mechanism that is not shown.

Figure 30:
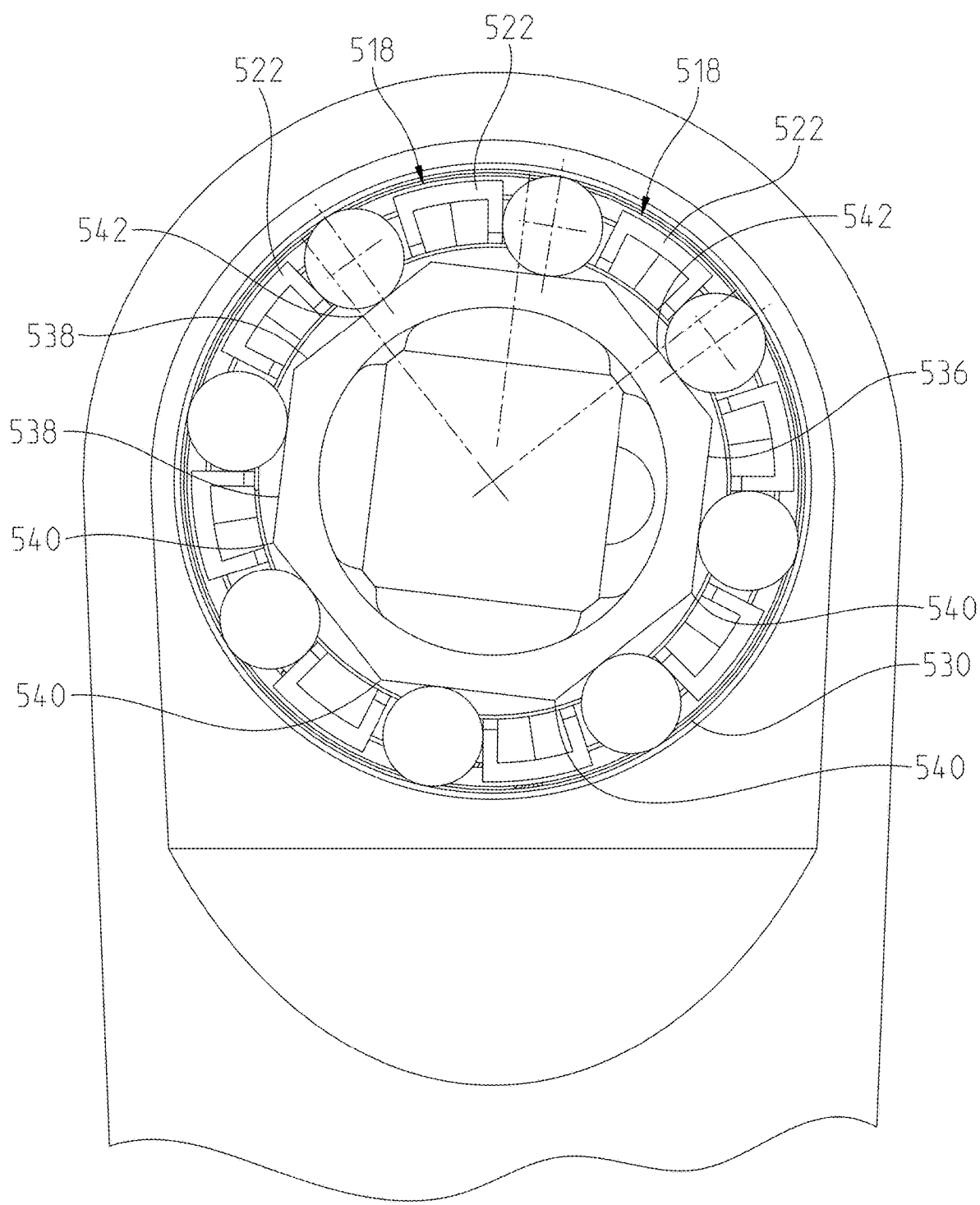
FIG. 30 is a sectional view of the roller clutch of FIG. 29 showing how the rollers and fingers are arranged around the faceted race.
Figure 31:
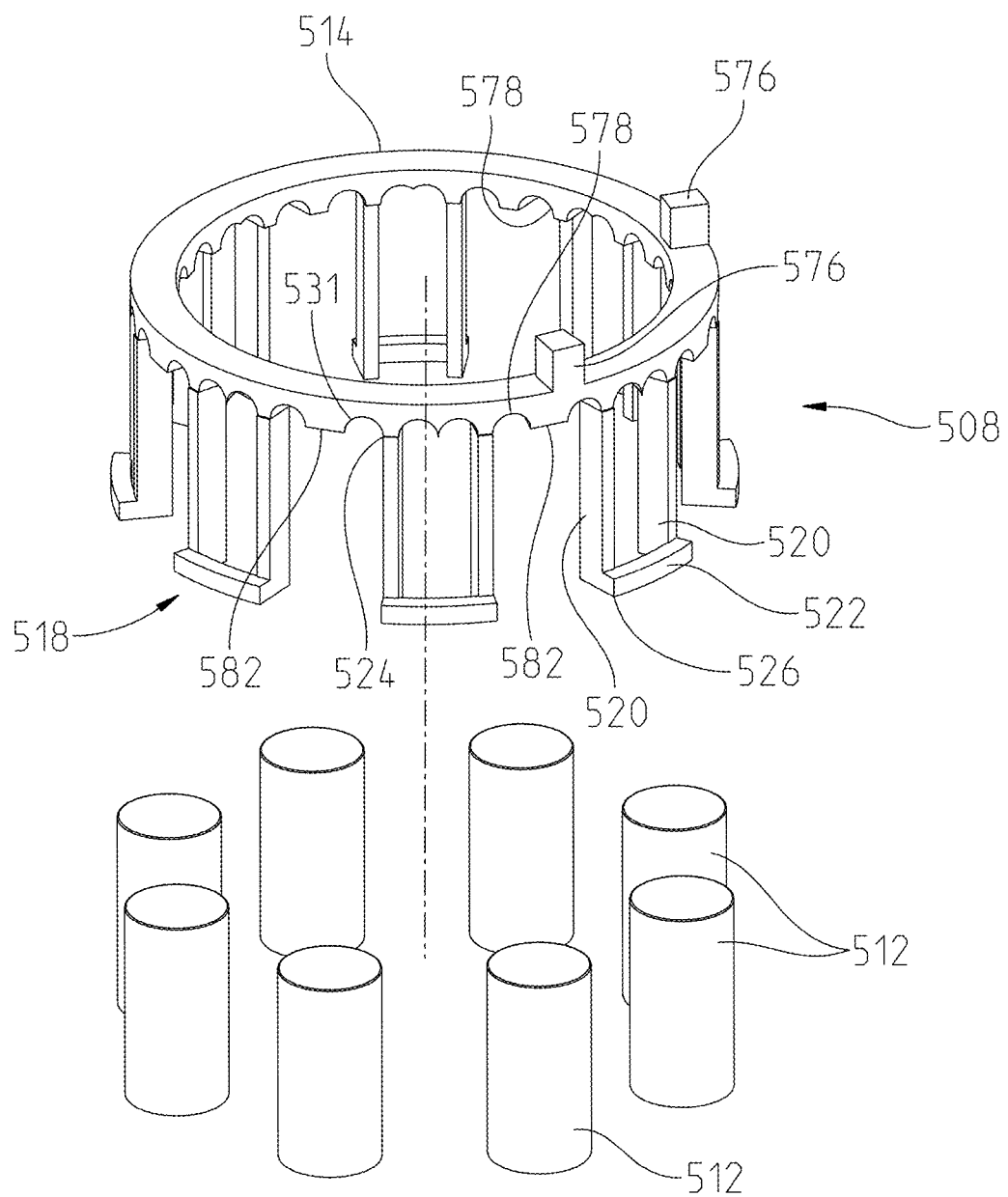
FIG. 31 is an exploded view of the cage and rollers shown in FIGS. 29 and 30.

A spindle 534 includes an octagonal race 536 that includes facets 538 that end in vertexes 540 that define the lateral extend of the flat facets 538 on the spindle 534. The vertexes 540 as shown in FIGS. 29 and 30 are sharp corners, but the vertexes could be properly the intersections of the flat surfaces of the facets 538 in the case the vertexes 540 as shown are rounded over. In such a case of rounded vertexes, the length of each facet 538 would be reduced by the amount the vertexes are rounded. Each facet 538 has a midpoint 542 that is located in the middle of each facet 538 and is halfway between the vertexes 540. A switch retaining block 546 is fixed to the spindle 534 by having its square mounting boss 548 inserted into a socket 550 on the spindle. The socket 550 is opposite the square drive post 552 that is used to engage sockets. The switch retaining block 546 has a detent pocket 554 for receiving a ball 556 that is biased with spring 558 against a switch 560 that is pivotally mounted above the switch retaining block 546. The spring 558 and biased ball 556 are designed to selectively lock the switch 560 into a first and second positions that correspond with the ball 556 being located at ends of a detent pocket 562 located in the switch retaining block 546. The switch 560 has a shifting post 566 that is opposite to the location of the spring 558. The shifting post 566 is straddled by two shifting springs 570 that ride in an annular guide slot 572 located in the switch retaining block 546. The shifting springs 570 are held between two shifting pegs 576 that extend from the base 514 of the cage 508 opposite of the fingers 518.

Figure 32:
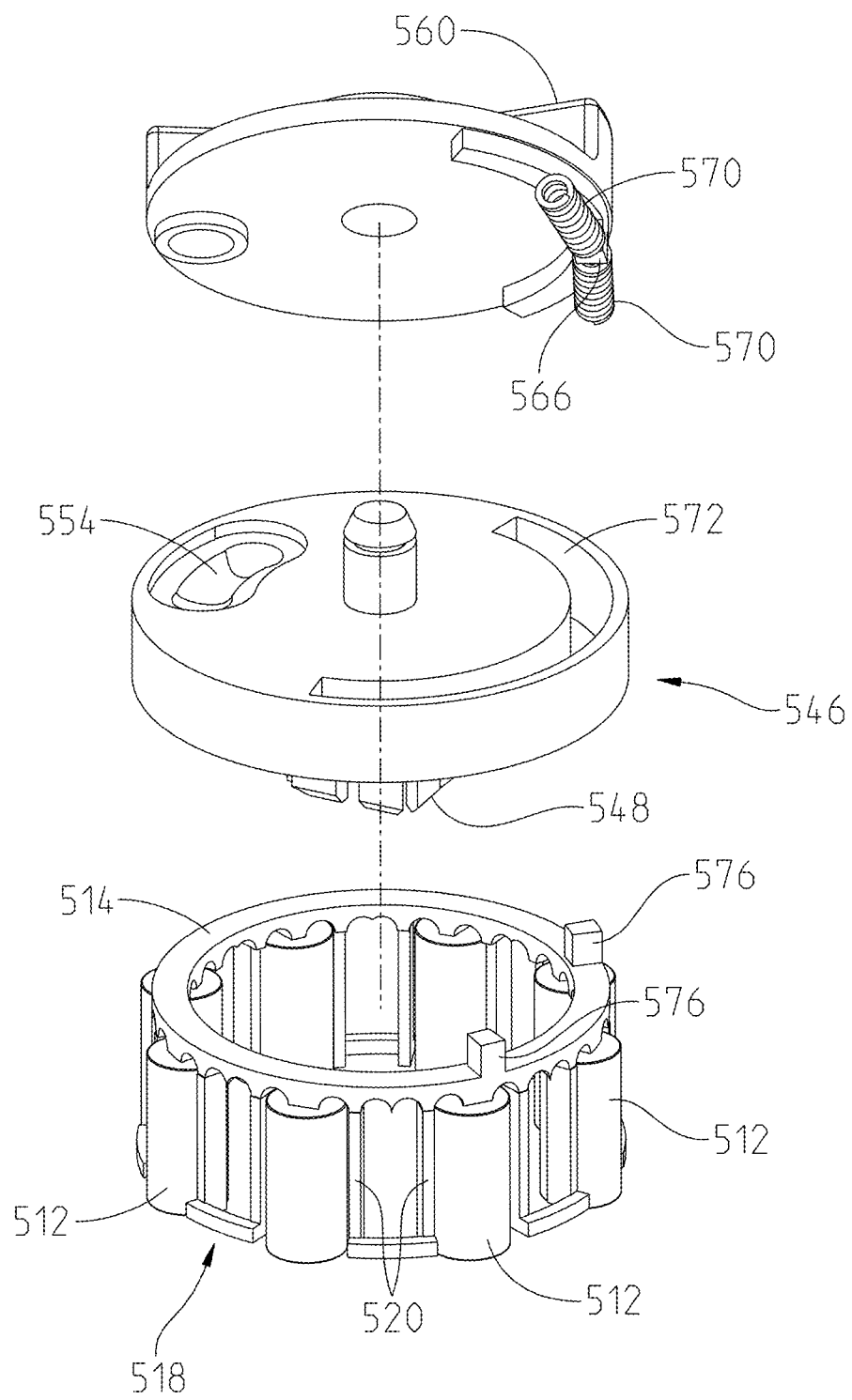
FIG. 32 is an exploded view showing parts of the roller clutch of FIGS. 29-31 specifically, showing the switch and switch retaining block in relation to the cage and rollers.

When the switch 560 is turned into its first position, the rightmost shifting spring 570 in FIG. 32 is compressed against the rightmost shifting peg 576 in FIG. 32. This biases the entire cage 508 and the fingers 518 to the right as viewed in FIG. 30. This bias against all of the fingers 518 shifts the rollers 512 to the right of the midpoints 542 of each facet 538. In other words, the entire cage 508 and rollers 512 are biased in a clockwise direction as viewed in FIG. 30. As the cylindrical race 530 is rotated in the clockwise direction as viewed in FIG. 30, the rollers 512 will be wedged into contact with both races 530 and 536. Rotation in the clockwise direction with the rollers 512 located as shown in FIG. 32 is a wedging direction, which will cause the spindle to rotate with the cylindrical race 530 as the rollers 512 are wedged into contact with the cylindrical race 530 and each corresponding facet 538. As can be seen in FIG. 30, the midpoints 542 of each facet 538 are radially located at a relatively far distance from the cylindrical race 530 and moving away from the midpoints 542 in either direction will correspond to points on each facet that is radially nearer the cylindrical race 530. Shifting the rollers 512 into a location spaced from their corresponding midpoint 542 determines the wedging direction. FIG. 30 shows the switch 560 in its first position, and shifting the switch 560 to its second position would locate the rollers 512 on the opposite sides of their corresponding midpoints 542, and reverse the wedging direction.

The shifting springs 570 are selected to have a predetermined force to urge the rollers 512 into a first initial position that is spaced from the corresponding midpoints 542. Rotating in the wedging direction causes the rollers to roll away from the corresponding midpoints 542 along the facets 538. The rollers 512 rolling away from the midpoints 542 may be a very small amount, and due to tolerances on the mating parts (rollers 512, and races 530, 536) the amount of movement for the rollers 512 from their initial position to their fully wedged position may not be even. In such a case, the cage 508 may urge more even engagement in two ways. As a first mechanism of load balancing, an early engaging roller that first achieves its fully wedged position, can shift the entire cage 508 by rotating it. As a second mechanism, the individual fingers 518 may bend because they extend from the base 514 of the cage 508 in a cantilevered fashion. The fingers 518 have riser bars 520 that are chosen to be of an appropriate thickness to flex under differential local loading from a particular roller 512 and still allow the entire cage 508 to shift as necessary. The fingers 518 are hollow between the riser bars 520 so that they take up enough space to locate a relatively few rollers 512 around the race 536. Solid fingers 518 would not resiliently bend and distribute loads evenly across all of the rollers 512. It is contemplated that the race 530 could have facets 538 and race 536 could be cylindrical, which would be the opposite configuration as shown, and this configuration would still achieve the wedging of rollers 512 as described above.

The shape of the cage 508 and fingers 518 facilitate cantilevered bending of individual fingers 518 to evenly distribute load amongst all of the rollers 512. The rollers 512 are purposely offset from the base 514 so that the rollers 512 contact their corresponding adjacent finger 518 above where the fingers 518 meet the base. Each finger 518 is adjacent to a set scallops 578. The rollers 512 rest on an offsetting platform 582 that is elevated from the bottoms of the scallops 578 in the base. This means that the rollers 512 contact the fingers 518 above where they join the base 514. Further, the scallops 578 provide a smooth and rounded transition into the fingers 518. This configuration of contact of rollers 512 above the base 514 prevents shearing of the fingers 518 and facilitates cantilevered bending. The rounded transition from the base into the fingers 518 through scallops 578 prevents a stress riser that could cause fingers 518 to fail at a sharp corner. It is also contemplated that contact with the fingers 518 above where the fingers 518 join the base 514 may be achieved by chamfering the ends of rollers 512 nearest the base 514. The configuration of having the rollers 512 rest on the offsetting platforms or chamfering the ends of the rollers 512 near the base 514 ensure that the rollers 512 contact the fingers 518 at a location spaced from where the fingers 518 join the base 514.

Figure 33:
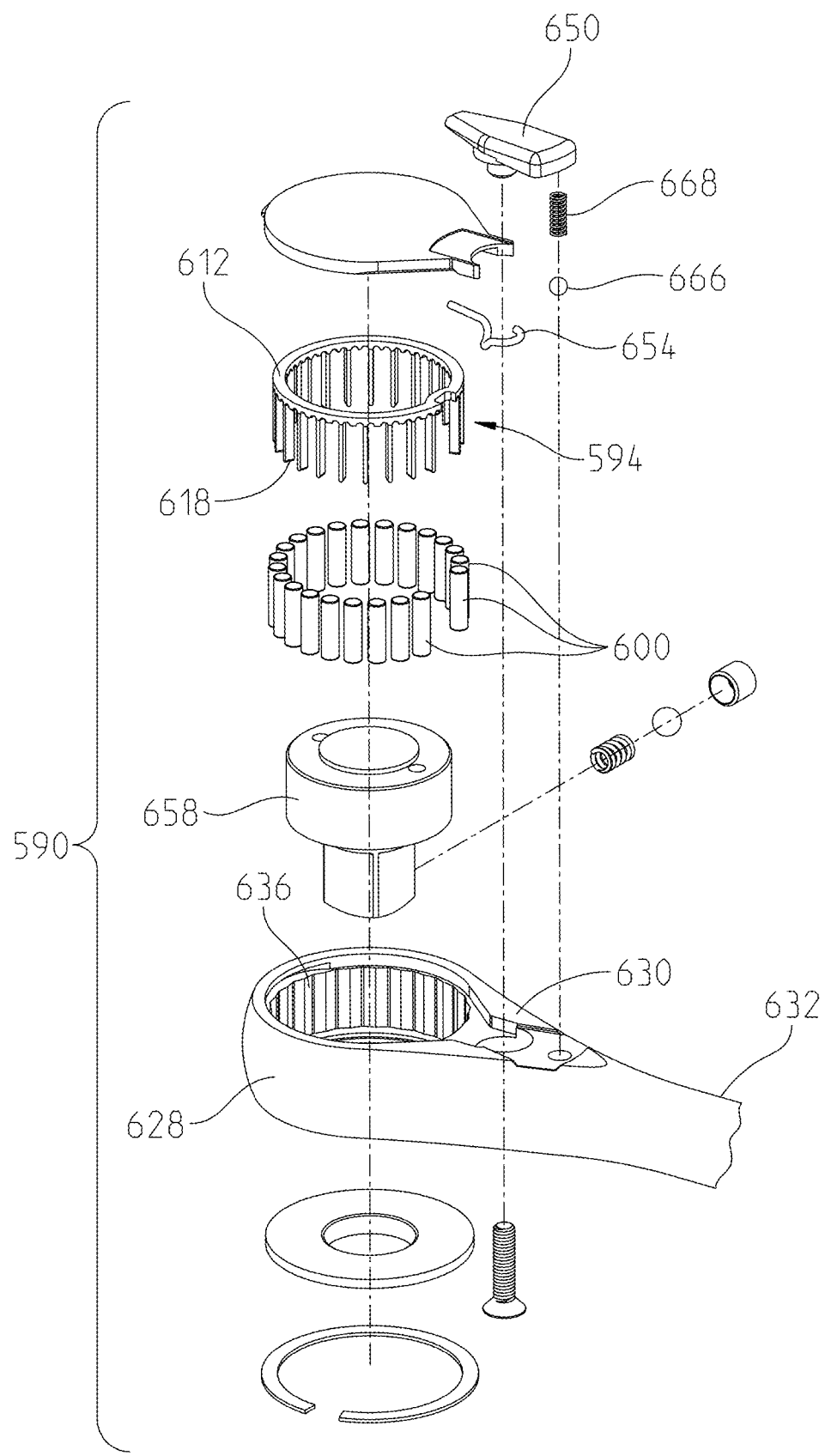
FIG. 33 is an exploded view of a roller clutch having a spindle with a cylindrical race thereon.
Figure 34:
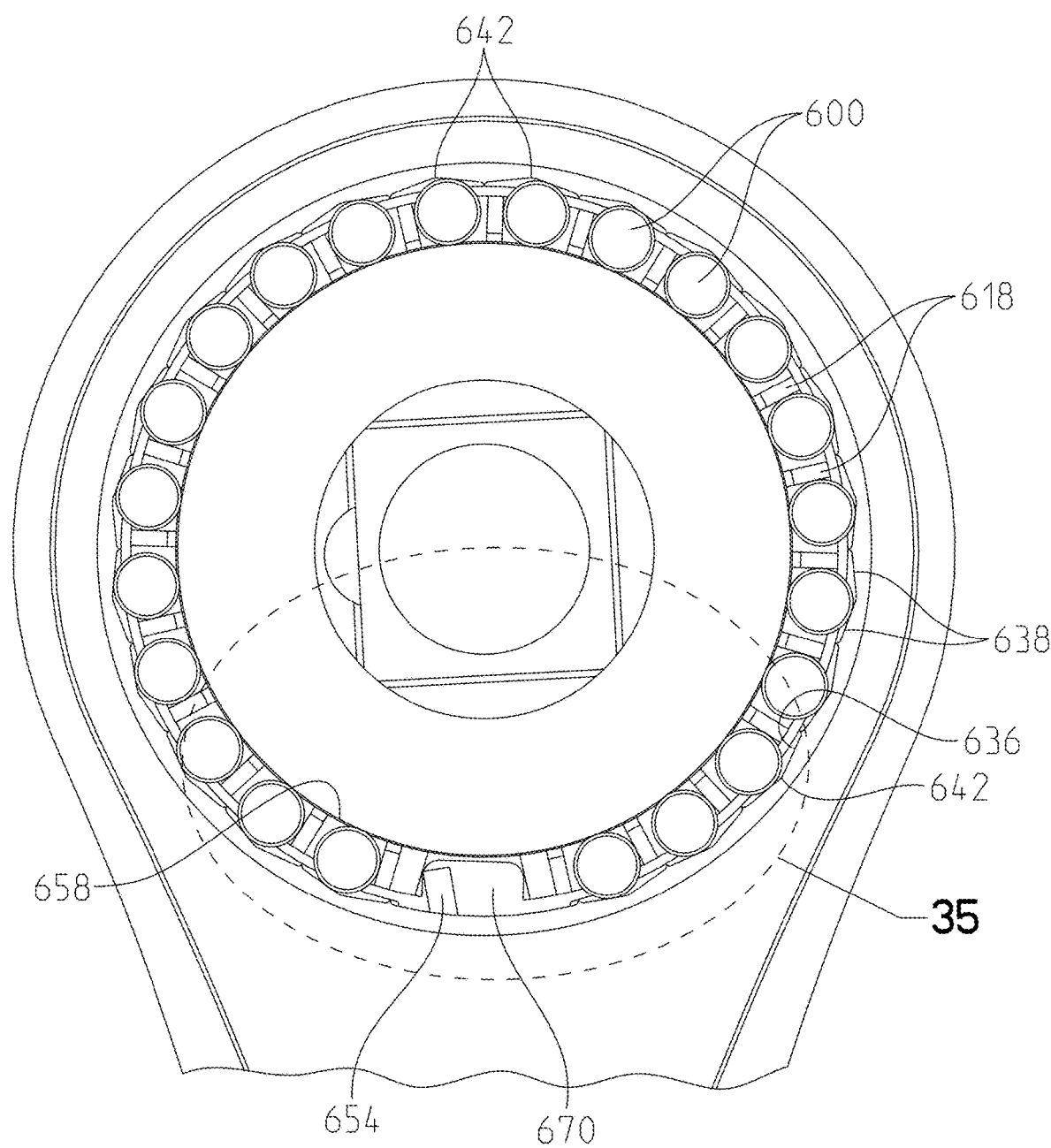
FIG. 34 is a sectional view of the roller clutch through the spindle and both races.
Figure 35:
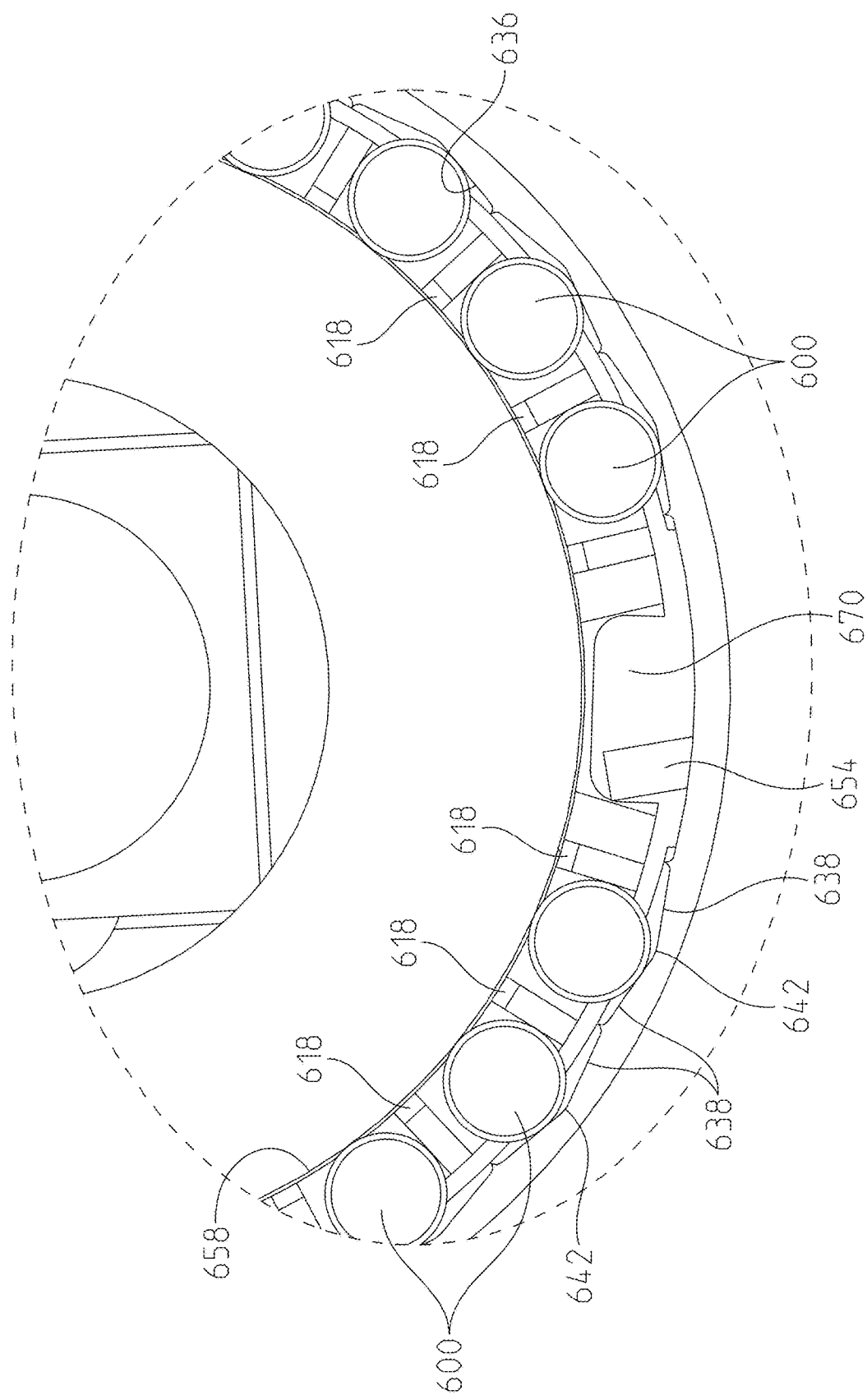
FIG. 35 is a magnified view of how the rollers, cage, and races interact.
Figure 36:
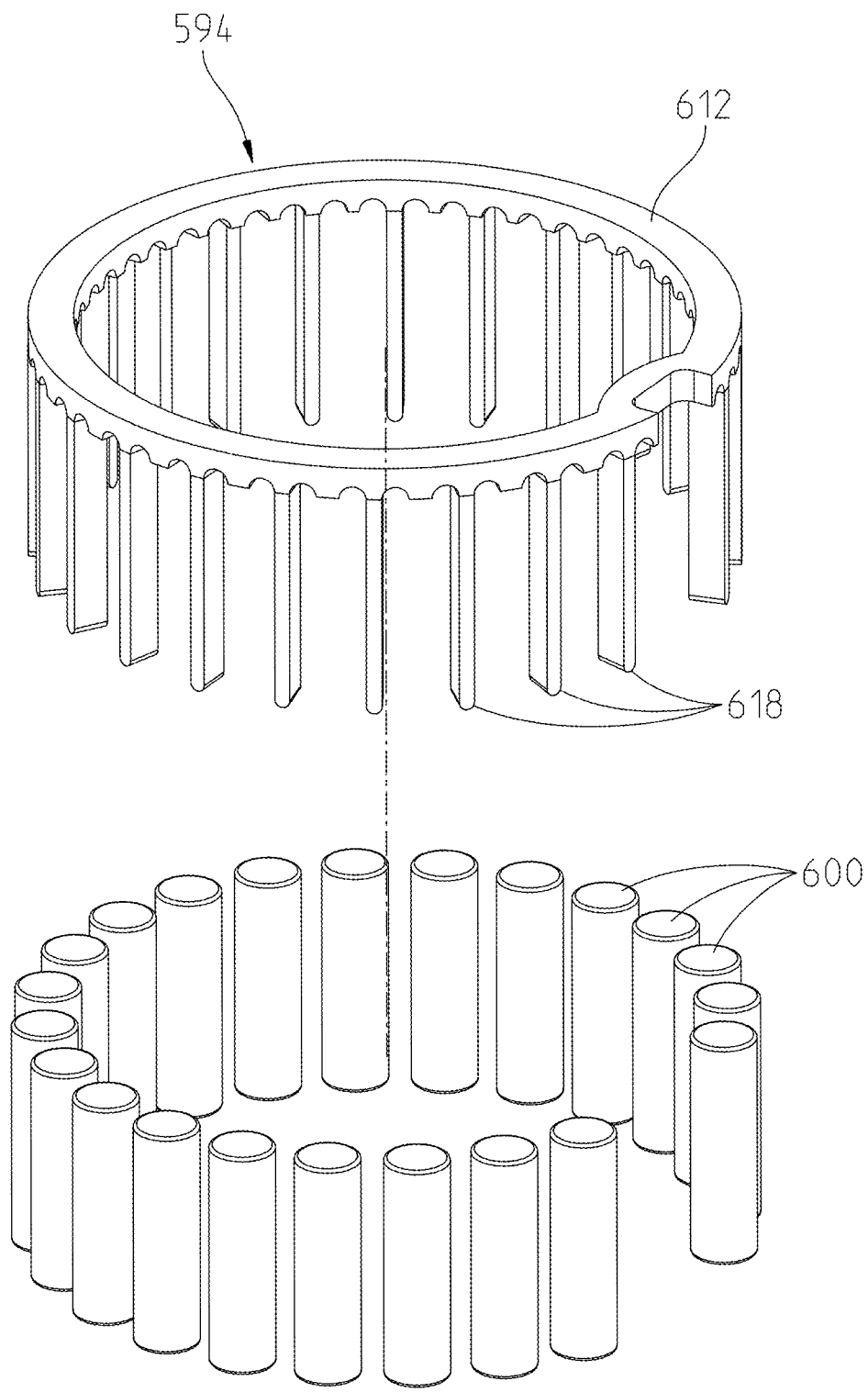
FIG. 36 is an exploded view of the rollers and cage that is shown in FIG. 33.
Figure 37:
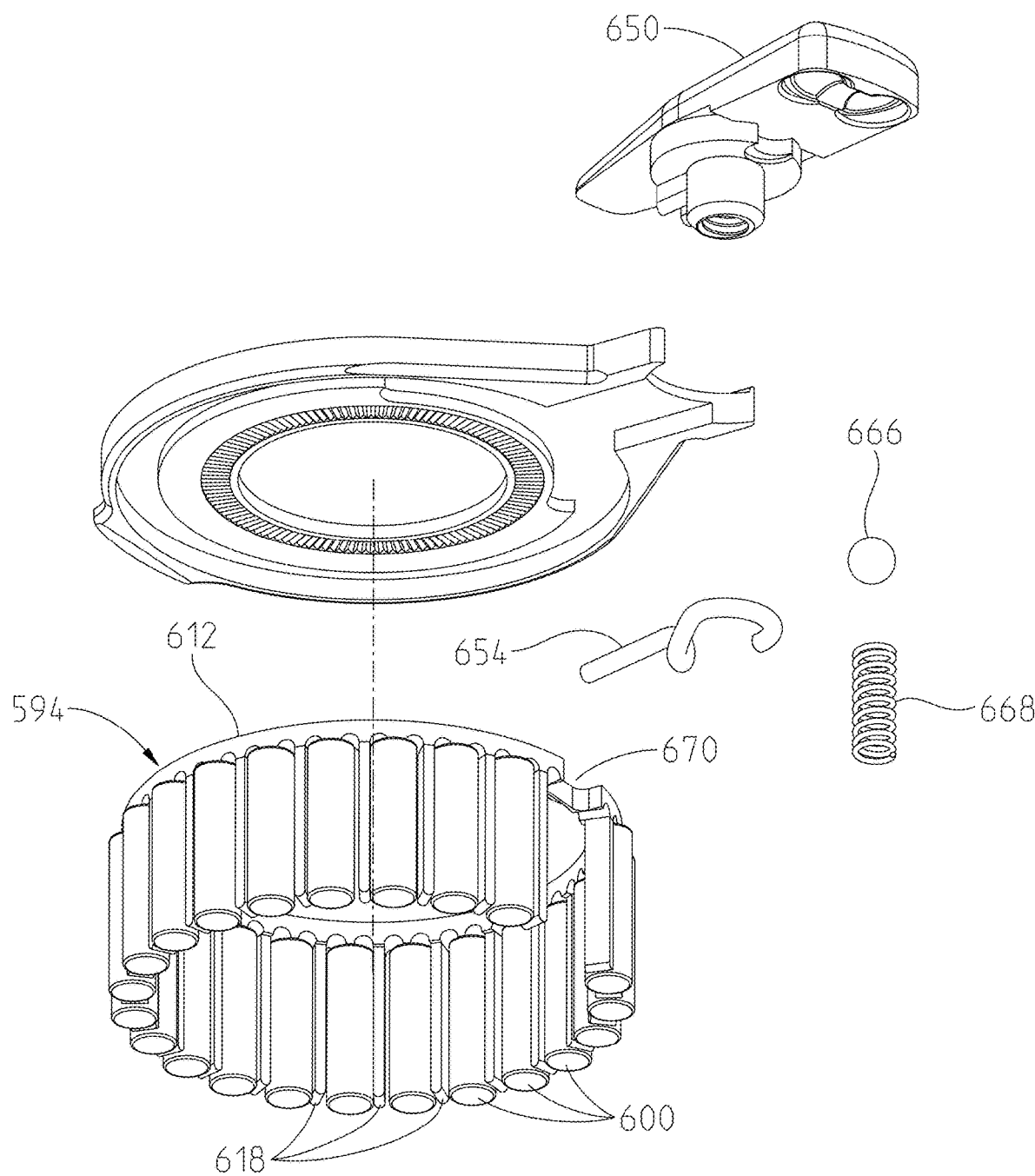
FIG. 37 is an exploded view of the rollers, cage and switch shown in FIG. 33.

FIG. 33 shows an exploded view of a roller clutch 590. This roller clutch includes a cage 594 that acts as a load balancing mechanism to facilitate simultaneous engagement of rollers 600 that are held within the cage 594. The cage 594 acts as part of a shifting mechanism in conjunction with other parts, as will be described below. The cage 594 has a base 612 with a plurality of fingers 618. The fingers 618 extend from the base 612 in a cantilevered manner. The cage 594 is assembled within a head 628 of a ratchet body 630 that includes a handle 632. The head 628 includes an outer race 636 that includes facets 638 that straddle valleys 642. The facets 638 are inclined surfaces with respect to the valleys 642. An inner race 658 is a cylindrical race that is rotatably held within the outer race 636. In this case, the wedging direction is determined by which side of the valleys 642 the rollers 600 are located. The cage 594 and fingers 618 thereon are shifted with respect to the valleys 642 with a switch 650. The switch 650 is selectively lockable and moves a shifting spring 654 that is cantilevered from the switch 650. The switch 650 pivots about screw 660 and is held in selected positions with a detent ball 666 biased by spring 668. The shifting spring 654 extends into a shifting slot 670 in the base 612 of the cage 594. Pivoting the switch 650 causes the fingers 618 of the cage 594 to be selectively restrained with respect to the valleys 642 on a chosen side of the valleys 370. As shown in FIG. 35, the rollers 600, are on the left sides of the valleys 642 and the fingers 618 are in direct contact with the rollers 618. In the case shown, rotation of the inner race 658 (the cylindrical race) in a clockwise direction will correspond to the wedging direction. Shifting the switch 650 into its second position, opposite to that shown in FIG. 35, will locate the rollers on the opposite side of the valleys 642 and change the wedging direction. The fingers 618 are restrained with respect to the valleys 642 to a limit defined by the shifting slot 670. The overall function of the configuration shown in FIGS. 33-35 is the same as that in FIGS. 21-24.

The invention is not limited to the disclosure above but may be modified within the scope of the following claims.

What is claimed is:

1. A locking clutch comprising:
    an inner race rotatable within and respect to an outer race;
    one of said races having a cylindrically shaped surface adjacent to the other of said races;
    said other of said races having a plurality of facets thereon, each said facet being bounded by vertexes and each facet having a midpoint;
    a plurality of rollers located between said races and adjacent to said midpoint of said facets;
    a shifting mechanism including a cage having fingers, said cage being selectively restrained in a first and second position with respect to said other race so that said fingers are selectively restrained with respect to said facets, said fingers shifting said rollers to a first position spaced from midpoints of said facets, rotation of said inner race with respect to said outer race in direction that induces said rollers to roll away from said corresponding midpoints and along said facets to drive said rollers into contact both said races locating said rollers in a second position being a wedging direction, and rotation of said inner race with respect to said outer race in a direction opposite to said wedging direction tending to urge said rollers toward said first position being a free rotating direction, said wedging direction and said free rotating direction being changeable by moving said cage to either of its said first or second positions; and
    a portion of said cage being movable from its said first or second position in response to differential movement of said rollers into their said second position.

2. The locking clutch of claim 1, wherein said shifting mechanism includes a switch being selectively lockable with respect to said other race and said switch includes a shifting spring for biasing at least one of said fingers of said cage into contact with at least one of said rollers.

3. The locking clutch of claim 2, wherein said shifting spring is capable of being deflected in response to said differential movement of said rollers straddling said fingers.

4. The locking clutch of claim 2, wherein said fingers have a pair of riser bars being joined by a bridge, said riser bars being spaced from each other and said riser bars being resilient.

5. The locking clutch of claim 1, wherein said shifting mechanism includes a switch being selectively lockable in a first position and in a second position with respect to said other race and said switch including a shifting post being straddled by shifting springs, said cage including shifting pegs opposite said fingers and said shifting springs being located between said shifting pegs on said cage, said first position of said switch compressing one of said shifting springs between said shifting post of said switch and one of said shifting pegs of said cage, said second position of said switch compressing said other of said shifting springs between said shifting post of said switch and said other of said shifting pegs of said cage.

6. The locking clutch of claim 5, wherein said switch includes a biased detent member for engaging a detent slot that is fixed with respect to said other race, engagement of said biased detent member maintaining said first and second positions of said switch.

7. The locking clutch of claim 1, further comprising a shifting spring for urging one of said fingers of said cage into contact with at least one of rollers.

8. A locking clutch comprising:
    an inner race rotatable within and respect to an outer race;
    one of said races having a cylindrically shaped surface adjacent to the other of said races;
    said other of said races having a plurality of facets thereon, each said facet being bounded by vertexes and each facet having a midpoint;
    a plurality of rollers located between said races and adjacent to said midpoint of said facets;
    a cage having fingers that are restrained with respect to said other race so that said fingers are restrained with respect to said facets, said fingers holding said rollers in a first position with respect to said midpoints, rotation of said inner race with respect to said outer race in a direction that induces said rollers to roll away from said corresponding midpoints along said facets to drive said rollers into contact with both said races locating said rollers in a second position being a wedging direction, and rotation of said inner race with respect to said outer race in a direction opposite to said wedging direction tending to urge said rollers toward said first position being a free rotating direction; and a portion of said cage being movable in response to differential movement of said rollers into their said second position.

9. The locking clutch of claim 8, including a shifting mechanism having a switch being selectively lockable with respect to said other race and said switch includes a shifting spring for biasing at least one of said fingers of said cage into contact with at least one of said rollers.

10. The locking clutch of claim 9, wherein said spring is capable of being deflected in response to said differential movement of said rollers straddling said fingers.

11. The locking clutch of claim 9, wherein said fingers have a pair of riser bars being joined by a bridge, said riser bars being spaced from each other and said riser bars being resilient.

12. The locking clutch of claim 8, wherein said shifting mechanism includes a switch being selectively lockable in a first position and in a second position with respect to said other race and said switch including a shifting post being straddled by shifting springs, said cage including shifting pegs opposite said fingers and said shifting springs being located between said shifting pegs on said cage, said first position of said switch compressing one of said shifting springs between said shifting post of said switch and one of said shifting pegs of said cage, said second position of said switch compressing said other of said shifting springs between said shifting post of said switch and said other of said shifting pegs of said cage.

13. The locking clutch of claim 12, wherein said fingers have a pair of riser bars being joined by a bridge, said riser bars being spaced from each other and said riser bars being resilient.

14. A locking clutch comprising:

an inner race rotatable within and respect to an outer race;

one of said races having a cylindrically shaped surface adjacent to the other of said races;

said other of said races having a plurality of facets thereon, each said facet being surrounded by vertexes and each facet having a midpoint;

a plurality of rollers located between said races and adjacent to said midpoint of said facets;

a cage having fingers, said cage being selectively restrained in a first and second position with respect to said other race so that said fingers are selectively restrained with respect to said facets, said fingers shifting said rollers to a first position spaced from said midpoints of said facets, rotation of said inner race with respect to said outer race in a direction that induces said rollers to roll away from said corresponding midpoints and along said facets to drives aid rollers into contact with both said races locating said rollers in a second position being a wedging direction, and rotation of said inner race with respect to said outer race in a direction opposite to said wedging direction tending to urge said rollers toward said first position being a free rotating direction, said wedging direction and said free rotating direction being changeable by moving said cage to either of its said first or second positions; and a switch being selectively lockable with respect to said other race and interacting with said cage to form a shifting mechanism, said switch including a shifting spring for biasing at least one of said fingers of said cage into contact with at least one of said rollers, a portion of said cage being movable from its said first or second position in response to differential movement of said rollers into their said second position.

15. The locking clutch of claim 14, wherein said switch includes a shifting post being straddled by said shifting spring and another shifting spring, said cage including shifting pegs opposite said fingers and said shifting springs being located between said shifting pegs on said cage, said first position of said switch compressing said shifting spring between said shifting post of said switch and one of said shifting pegs of said cage, said second position of said switch compressing said other of said shifting springs between said shifting post of said switch and said other of said shifting pegs.

16. The locking clutch of claim 15, wherein said switch includes a biased detent member for engaging a detent slot that is fixed with respect to said other race, engagement of said biased detent member maintain said first and second positions of said switch.

17. The locking clutch of claim 14, wherein said cage includes a base to which said fingers are joined, said rollers resting on elevated portions of said base to ensure said rollers contact said fingers at a location spaced from where said fingers are joined to said base.

* * * * *